US012583099B2

(12) United States Patent
Wang et al.

(10) Patent No.: US 12,583,099 B2
(45) Date of Patent: Mar. 24, 2026

(54) MOVEMENT CONTROL METHOD FOR UNDERACTUATED SYSTEM ROBOT AND UNDERACTUATED SYSTEM ROBOT

(71) Applicant: Tencent Technology (Shenzhen) Company Limited, Shenzhen (CN)

(72) Inventors: Shuai Wang, Shenzhen (CN); Haitao Wang, Shenzhen (CN); Yuan Dai, Shenzhen (CN); Dongsheng Zhang, Shenzhen (CN); Ke Chen, Shenzhen (CN); Ruirui Zhang, Shenzhen (CN); Rui Wang, Shenzhen (CN); Jingfan Zhang, Shenzhen (CN); Jie Lai, Shenzhen (CN); Yu Zheng, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 275 days.

(21) Appl. No.: 18/350,339

(22) Filed: Jul. 11, 2023

(65) Prior Publication Data

US 2023/0347501 A1     Nov. 2, 2023

Related U.S. Application Data

(63) Continuation of application No. PCT/CN2022/129831, filed on Nov. 4, 2022.

(30) Foreign Application Priority Data

Jan. 7, 2022   (CN) ......................... 202210015856.0

(51) Int. Cl.
| | |
|---|---|
| *B25J 5/00* | (2006.01) |
| *B25J 9/16* | (2006.01) |
| *B25J 13/08* | (2006.01) |

(52) U.S. Cl.
CPC ............. *B25J 5/007* (2013.01); *B25J 9/1653* (2013.01); *B25J 13/088* (2013.01)

(58) Field of Classification Search
CPC ........ B25J 5/007; B25J 9/1653; B25J 9/1664; B25J 11/00; B25J 13/00; B25J 13/088; B25J 19/00; B62D 57/028; Y02T 10/72
See application file for complete search history.

(56) References Cited

U.S. PATENT DOCUMENTS

| | | | |
|---|---|---|---|
| 2004/0006408 A1 | 1/2004 | Kakutani et al. |
| 2017/0073055 A1 | 3/2017 | Song |

(Continued)

FOREIGN PATENT DOCUMENTS

| | | |
|---|---|---|
| CN | 104898669 A | 9/2015 |
| CN | 106428284 A | 2/2017 |

(Continued)

OTHER PUBLICATIONS

Chinese Office Action with English translation, Sep. 4, 2024, pp. 1-22, issued in Chinese Application Number 202210015856.0, State Intellectual Propertx Office, Beijing, China.

(Continued)

*Primary Examiner* — Dale Moyer
(74) *Attorney, Agent, or Firm* — Crowell & Moring LLP

(57)     ABSTRACT

A underactuated system robot includes a vehicle wheel portion and a base portion coupled to the vehicle wheel portion. A loaded object is placed on the base portion. The method includes: determining status information of a loaded object on a base portion; and controlling at least one of the base portion and a vehicle wheel portion to move according to the status information, so as to prevent the loaded object from falling from the base portion. In the embodiments, the base portion and/or the vehicle wheel portion can be controlled to move according to the status information of the (Continued)

loaded object on the base portion, to prevent the loaded object from falling from the base portion, thereby improving the stability of the underactuated system robot.

20 Claims, 20 Drawing Sheets

(56) References Cited

U.S. PATENT DOCUMENTS

| | | | | |
|---|---|---|---|---|
| 2019/0193798 | A1 | 6/2019 | Lu | |
| 2020/0180141 | A1* | 6/2020 | Dong | B62D 37/06 |
| 2023/0087057 | A1 | 3/2023 | Wang et al. | |
| 2023/0294281 | A1* | 9/2023 | Xu | B25J 9/163 |
| | | | | 701/36 |
| 2023/0302638 | A1* | 9/2023 | Huang | B25J 19/002 |
| 2024/0416502 | A1* | 12/2024 | Klokowski | B25J 15/028 |

FOREIGN PATENT DOCUMENTS

| | | | | |
|---|---|---|---|---|
| CN | 207903351 | U | 9/2018 | |
| CN | 109099898 | A | 12/2018 | |
| CN | 110764413 | A | 2/2020 | |
| CN | 111085446 | A * | 5/2020 | ............... B07C 3/02 |
| CN | 112975978 | A | 6/2021 | |
| CN | 113753150 | A | 12/2021 | |
| EP | 3771955 | A1 * | 2/2021 | ....... G05B 19/41895 |
| JP | 2006-123854 | A | 5/2006 | |
| JP | 2010-225139 | A | 10/2010 | |
| JP | 2019-119043 | A | 7/2019 | |
| WO | WO 2022/183786 | A1 | 9/2022 | |

OTHER PUBLICATIONS

International Search Report and Written Opinion for priority application No. PCT/CN2022/129831 dated Jan. 20, 2023, 10p, in Chinese language.

Concise Explanation of Relevancy for A10.

Japanese-language Office Action issued in Japanese Application No. 2024-514490 dated Apr. 7, 2025 with English translation (22 pages).

English-language Search Report issued in European Application No. 22918276.1 dated Feb. 20, 2025 (10 pages).

* cited by examiner

2900

MOVEMENT CONTROL METHOD FOR UNDERACTUATED SYSTEM ROBOT AND UNDERACTUATED SYSTEM ROBOT

RELATED APPLICATION

This application is a continuation application of International Patent Application No. PCT/CN2022/129831, filed on Nov. 4, 2022, which claims priority to Chinese Patent Application No. 202210015856.0, entitled "MOVEMENT CONTROL METHOD FOR UNDERACTUATED SYSTEM ROBOT AND UNDERACTUATED SYSTEM ROBOT" and filed on Jan. 7, 2022. Both applications are incorporated herein by reference in their entireties.

TECHNICAL FIELD

This disclosure relates to the field of robots, and in particular, to a movement control method for an underactuated system robot and an underactuated system robot.

BACKGROUND

An underactuated system robot is a robot with fewer drives than degrees of freedom of joints. Typically, the robot has a problem in balance. A wheel-legged robot with a base portion is used as an example. The base portion can float, and the robot moves through a vehicle wheel portion to keep balance. Therefore, it may be understood that the robot with an underactuated system has the problem of body attitude control.

During the actual use, it is possible to use the underactuated system robot to complete the specified task. For example, a wheel-legged robot uses the base portion to transport a spherical object. Since the spherical object has no form seal and force seal on the base portion, the spherical object is in an unstable state on the base portion, causing the possibility of falling. At present, no clear research result is obtained for the control method related to the problem.

SUMMARY

Embodiments of this disclosure provide a movement control method for an underactuated system robot and an underactuated system robot. At least one of a base portion or a vehicle wheel portion is controlled to move according to status information, so as to ensure that a loaded object is prevented from falling from the base portion, so as to improve the stability of the underactuated system robot. The technical solution includes at least the following solutions.

According to an aspect of this disclosure, a movement control method for an underactuated system robot is provided, the method being performed by a controller of the underactuated system robot, the underactuated system robot including a vehicle wheel portion and a base portion coupled to the vehicle wheel portion, a loaded object being placed on the base portion, and the method including:

determining status information of the loaded object on the base portion; and controlling at least one of the base portion or the vehicle wheel portion to move according to the status information to prevent the loaded object from falling from the base portion.

According to an aspect of this disclosure, an underactuated system robot is provided, which includes:

a vehicle wheel portion;

a base portion coupled to the vehicle wheel portion, the base portion being configured to bear the object; and a controller configured to control the underactuated system robot to by controlling at least one of the base portion or the vehicle wheel portion to move according to status information of the object on the base portion to prevent the loaded object from falling from the base portion.

According to an aspect of this disclosure, a movement control apparatus for an underactuated system robot is provided, the apparatus including:

a determination module, configured to determine status information of a loaded object on a base portion; and a control module, configured to control at least one of the base portion or a vehicle wheel portion to move according to the status information, so as to prevent the loaded object from falling from the base portion.

According to an aspect of this disclosure, a computer device is provided, including a processor, the processor being configured to: determine status information of a loaded object on a base portion; and control at least one of the base portion or the vehicle wheel portion to move according to the status information, so as to prevent the loaded object from falling from the base portion.

According to an aspect of this disclosure, a non-transitory computer-readable storage medium is provided. the computer-readable storage medium storoes at least one computer program, the at least one computer program, when executed by at least one processor, causing an underactuated system robot to perform steps includes:

determining status information of the loaded object on the base portion; and controlling at least one of the base portion or the vehicle wheel portion to move according to the status information to prevent the loaded object from falling from the base portion.

According to an aspect of this disclosure, a chip is provided, including a programmable logic circuit and/or program instructions, the chip, when run, being configured to implement the movement control method for an underactuated system robot according to any one of the above embodiments.

According to an aspect of this disclosure, a non-transitory computer program product is provided, including computer instructions stored in a computer-readable storage medium, a processor reading the computer instructions from the computer-readable storage medium and executing the computer instructions, to implement the movement control method for an underactuated system robot according to any one of the above embodiments.

Beneficial effects brought by the technical solutions provided in the embodiments of this disclosure include at least the following.

The underactuated system robot can control the base portion and/or the vehicle wheel portion to move according to the status information of the loaded object on the base portion, to prevent the loaded object from falling from the base portion, thereby improving the stability of the underactuated system robot.

Figure 1:
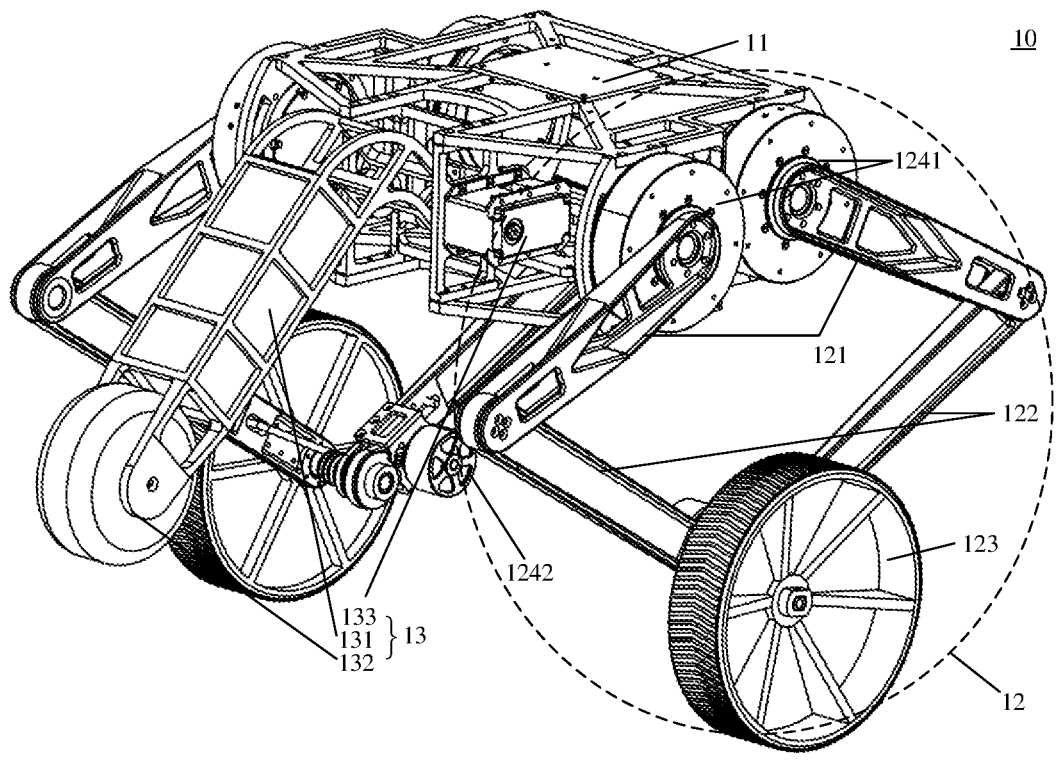
FIG. 1 is a schematic structural diagram of a wheel-legged robot according to an exemplary embodiment of this disclosure.

Reference numerals in the accompanying drawings are described below.

10—Wheel-legged robot;

11—Base portion;

12—Vehicle wheel portion; 121—Thigh unit; 122—Calf unit; 123—Driving wheel; 124—Driving unit; 1241—First driving motor; 1242—Second driving motor;

13—Tail portion; 131—Counterweight leg; 132—Driven wheel; 133—Third driving motor;

01—Torsion spring; 02—Rotary shaft; 03—Synchronous belt; 04—Synchronous pulley;

20—Loaded object.

DESCRIPTION OF EMBODIMENTS

Unless otherwise defined, all technical terms used in embodiments of this disclosure have the same meaning as commonly understood by a person skilled in the art. In the embodiments of this disclosure, "front" and "back" involved are based on front and back shown in the accompanying drawings. "First end" and "second end" are two opposite ends. To make the objectives, technical solutions, and advantages of this disclosure clearer, the following further describes implementations of this disclosure in detail with reference to the accompanying drawings.

An underactuated system robot is a robot with fewer drives than degrees of freedom of joints. The underactuated system robot generally has the problem of body balance.

FIG. 1 shows a wheel-legged robot 10 according to an exemplary embodiment of this disclosure. The wheel-legged robot 10 is a type of underactuated system robot, and a movement control method for an underactuated system robot provided in the embodiment of this disclosure can be implemented by the wheel-legged robot. The wheel-legged robot 10 combines the advantages of a wheeled robot and a biped robot, has high wheel energy efficiency, and strong adaptability, and can avoid obstacles by using legs on the uneven ground. The wheel-legged robot 10 is an unstable underactuated system, and only two contact points are provided between the ground and the wheels/legs, which leads to challenging balance control of the wheel-legged robot 10 because it is difficult to achieve the body balance.

For example, the wheel-legged robot 10 includes a base portion 11, vehicle wheel portions 12, and a tail portion 13.

The vehicle wheel portion 12 and the tail portion 13 are respectively drive-connected to the base portion 11. Exemplarily, the vehicle wheel portions 12 may be arranged on left and right sides, which may be completely symmetrical or not completely symmetrical on the left and right sides.

For example, each of the vehicle wheel portions 12 includes a leg portion and a wheel portion. The leg portion includes a thigh unit 121 and a calf unit 122, and the wheel portion includes a driving wheel 123. For example, the thigh unit 121 is composed of two rods and the calf unit 122 is composed of two rods. The two rods included by the thigh unit 121, the two rods included by the calf unit 122, and the base portion 11 form a planar five-link mechanism.

Exemplarily, the first driving motor 1241 is fixed to the base portion 11 for providing a driving force to the thigh unit 121.

The first driving motor 1241 includes two motors by way of example. Two rods included by the thigh unit 121 are respectively fixedly connected to output shafts of the two motors included by the first driving motor 1241, and connected ends of the two rods included by the thigh unit 121 and the two rods included by the calf unit 122 are all in the form of rotating pairs to form a planar five-link mechanism.

Exemplarily, a second driving motor 1242 is fixed to a certain rod of the calf unit 122 for providing a driving force to the driving wheel 123.

Figure 2:
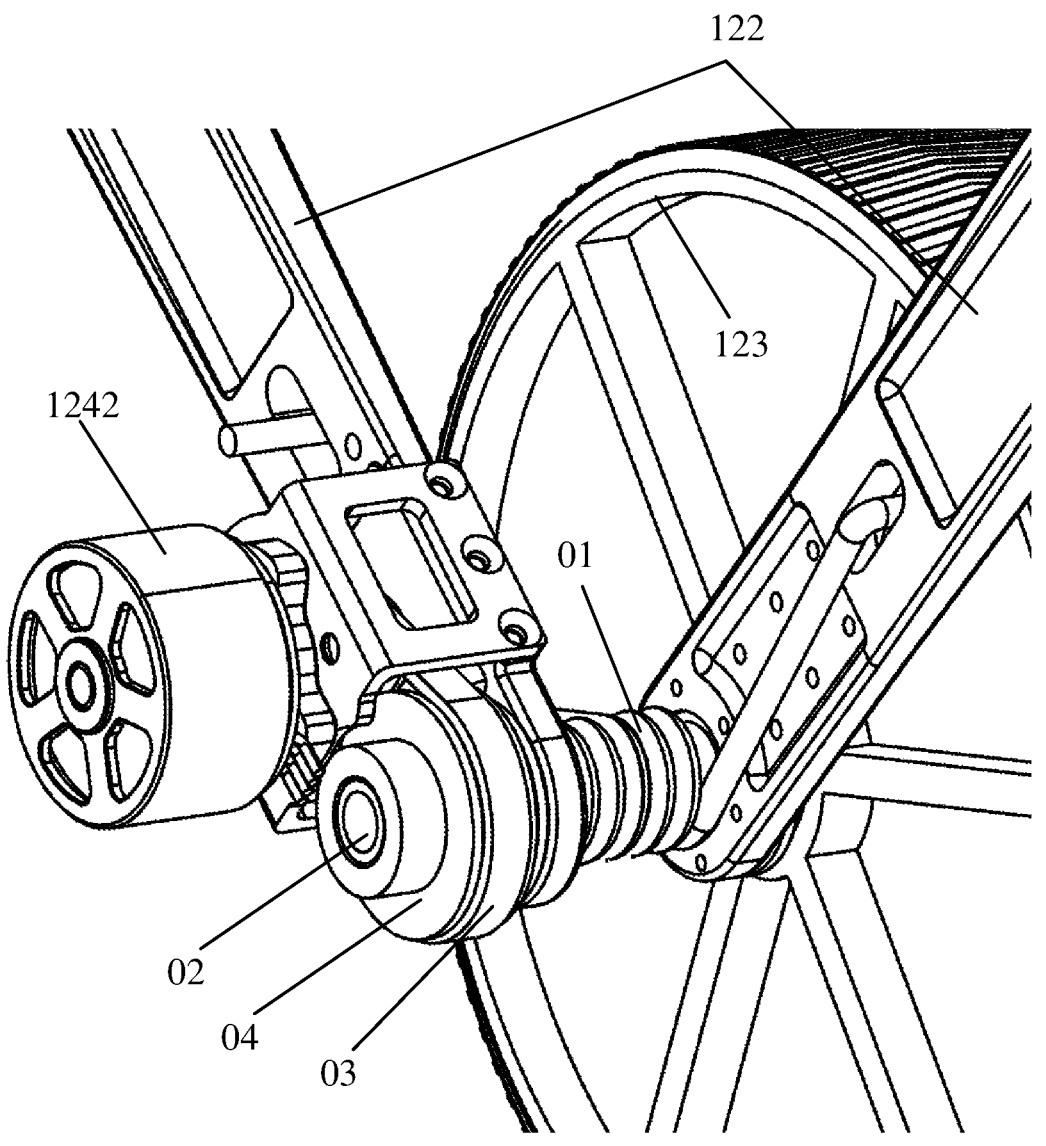
FIG. 2 is a partial schematic diagram of a wheel-legged robot according to an exemplary embodiment of this disclosure.

Referring to the partial schematic diagram of the wheel-legged robot 10 shown in FIG. 2, the driving of the driving wheel 123 can be implemented in the following manner. The second driving motor 1242 drives the rotary shaft 02 of the driving wheel 123 through belt transmission. The rotary shaft 02 is coaxial with an axial direction of the rotating pair between the two rods included by the calf unit 122. The torsion spring 01 is sleeved on the rotary shaft 02, and arms of the torsion spring 01 are respectively fixed to the two rods included by the calf unit 122.

Exemplarily, a synchronous pulley 04 is mounted to the output shaft of the second driving motor 1242, the synchronous pulley 04 is fixed to the rotary shaft 02, and the driving wheel 123 is fixed to the other section of the rotary shaft 02. The synchronous belt 03 is sleeved on the synchronous pulley 04. The second driving motor 1242 drives the synchronous pulley 04 to rotate by driving the synchronous belt 03, thereby driving the driving wheel 123 to rotate.

Exemplarily, in the wheel-legged robot 10 provided in the embodiment of this disclosure, the tail portion 13 includes a counterweight leg 131, a driven wheel 132, and a third driving motor 133. The counterweight leg 131 implements the balancing function during the movement of the wheel-legged robot 10, and the third driving motor 133 is configured to provide a driving force to the driven wheel 132.

Figure 3:
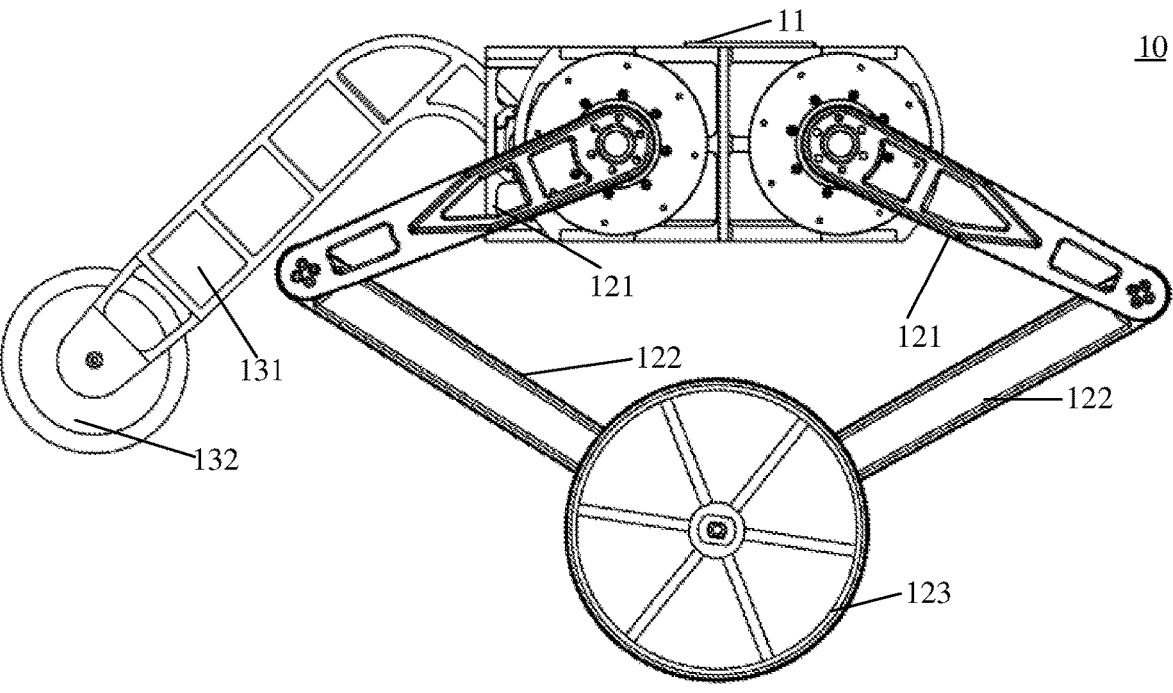
FIG. 3 is a front view of a wheel-legged robot standing with two wheels according to an exemplary embodiment of this disclosure.
Figure 4:
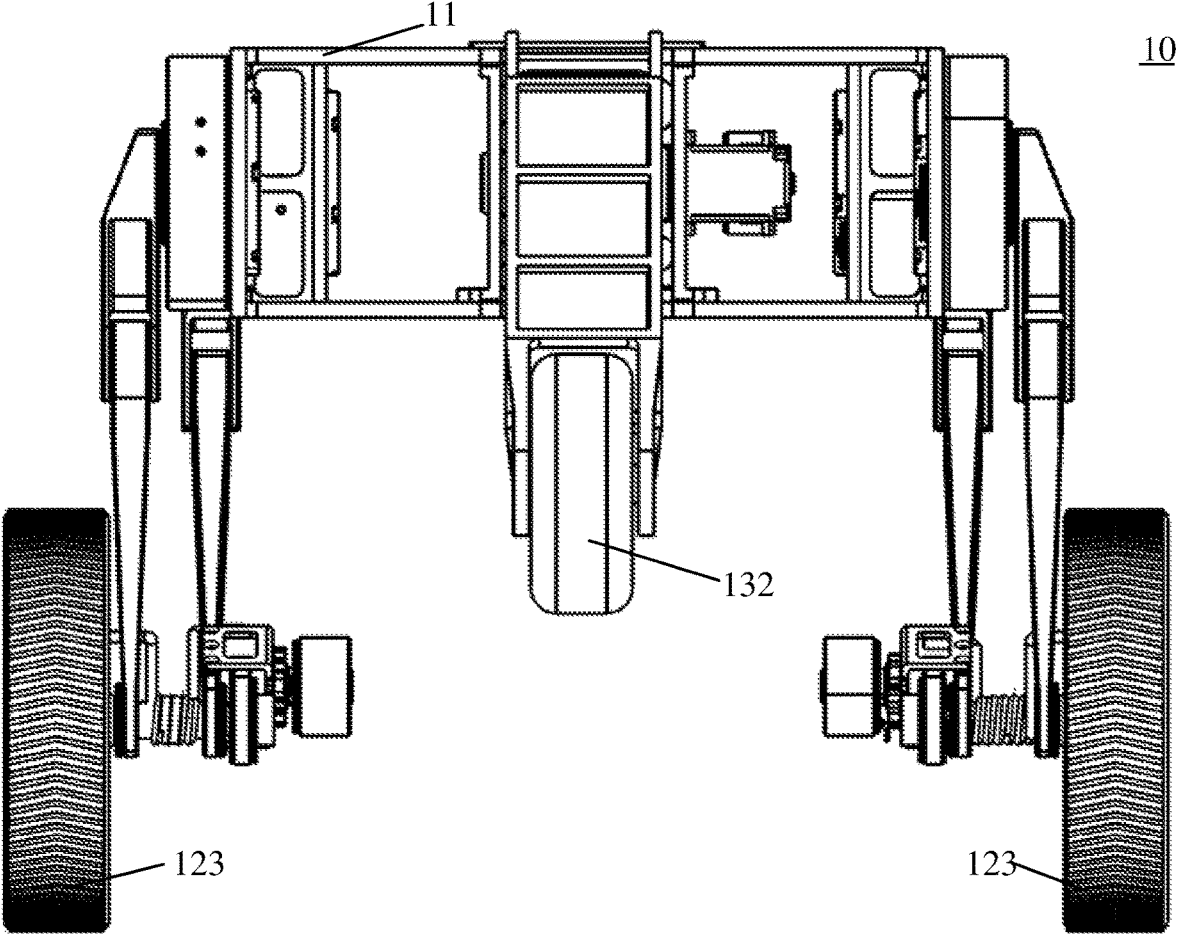
FIG. 4 is a side view of a wheel-legged robot standing with two wheels according to an exemplary embodiment of this disclosure.
Figure 5:
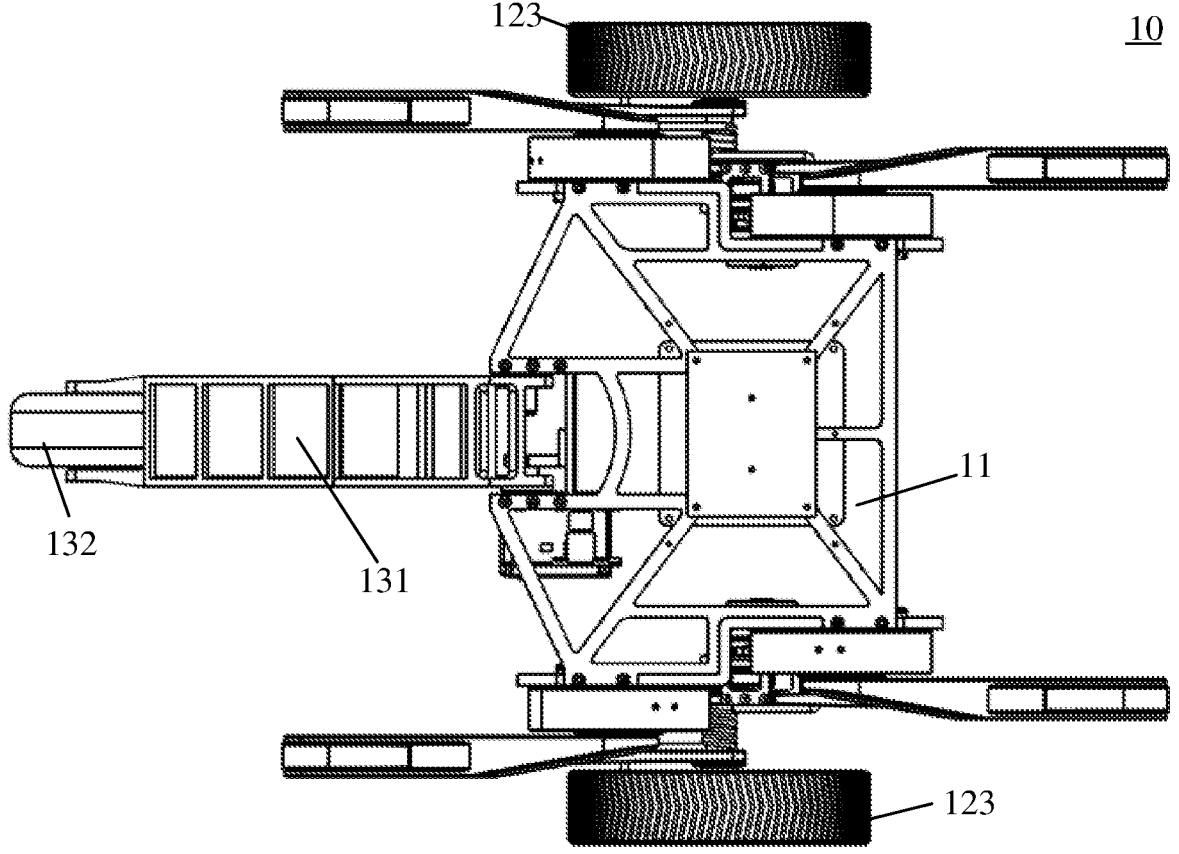
FIG. 5 is a top view of a wheel-legged robot standing with two wheels according to an exemplary embodiment of this disclosure.
Figure 6:
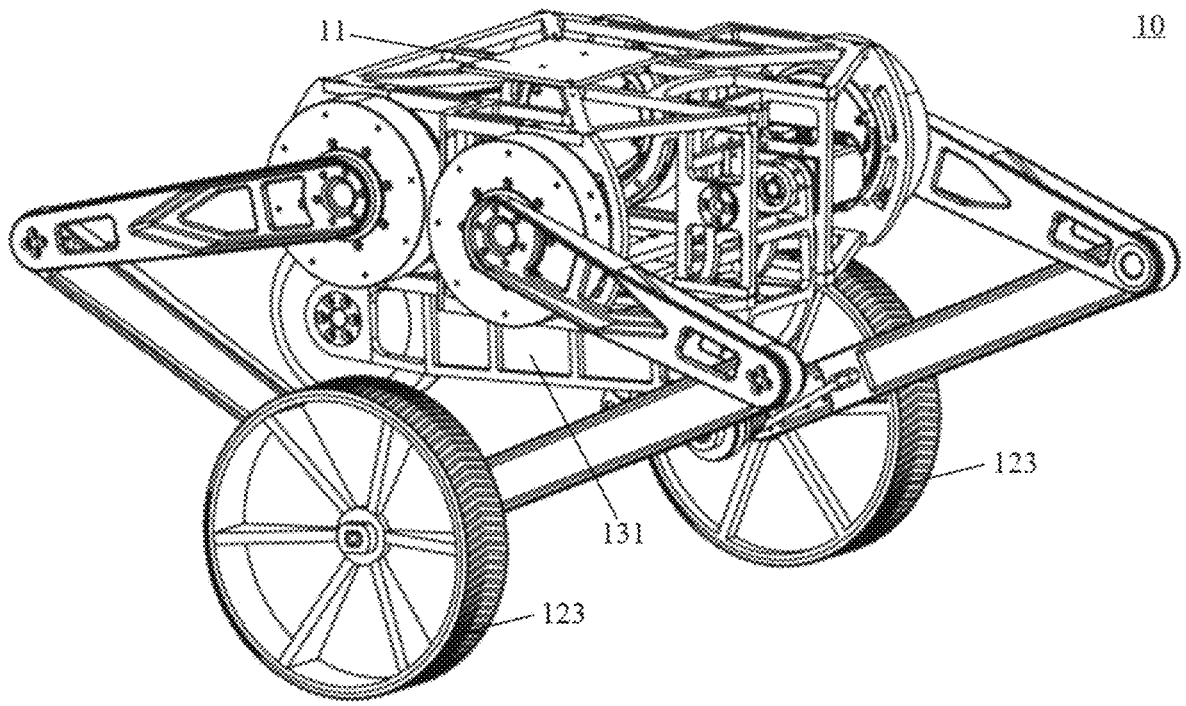
FIG. 6 shows a schematic three-dimensional view of a wheel-legged robot with a counterweight leg being in a retracted state according to an exemplary embodiment of this disclosure.

FIG. 3 to FIG. 5 respectively show a front view, a left view, and a top view of a wheel-legged robot 10 standing with two wheels. FIG. 6 shows a schematic three-dimensional view of a wheel-legged robot 10 with a counterweight leg 131 being in a retracted state.

Figure 8:
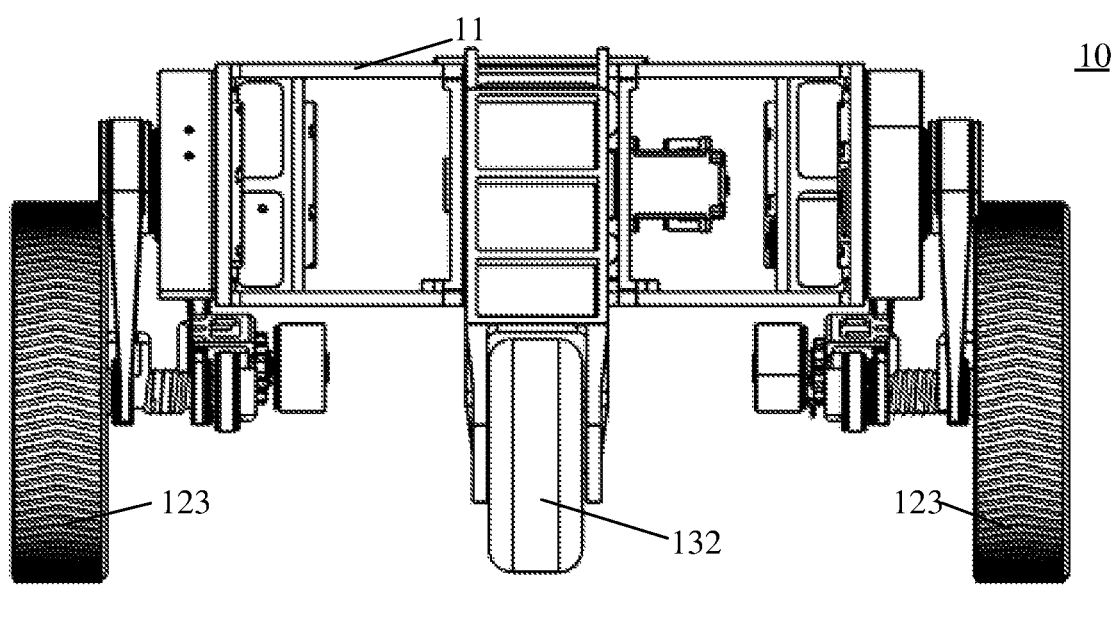
FIG. 8 is a side view of a wheel-legged robot standing with three wheels according to an exemplary embodiment of this disclosure.
Figure 9:
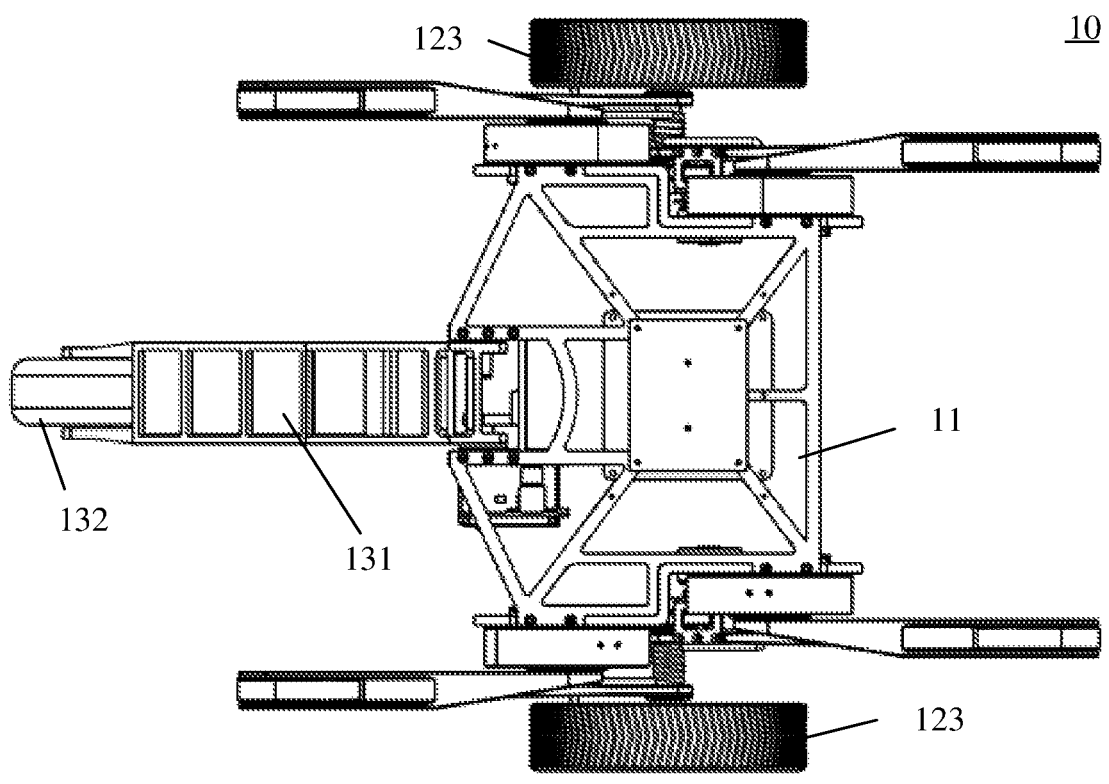
FIG. 9 is a top view of a wheel-legged robot standing with three wheels according to an exemplary embodiment of this disclosure.
Figure 10:
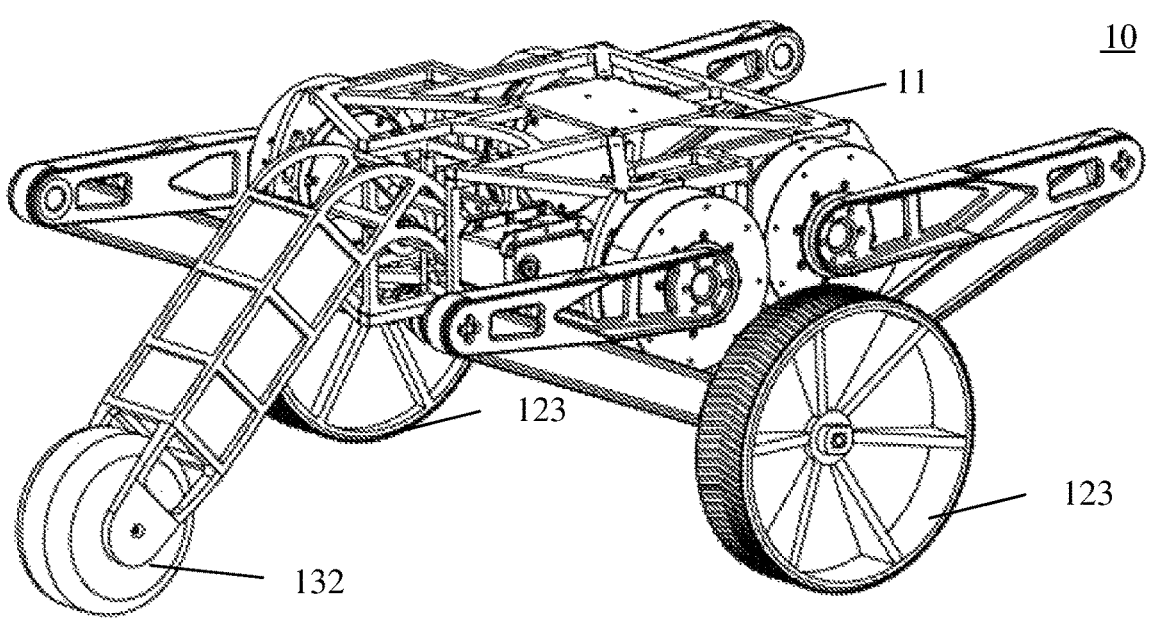
FIG. 10 is a schematic three-dimensional view of a wheel-legged robot standing with three wheels according to an exemplary embodiment of this disclosure.
Figure 11:
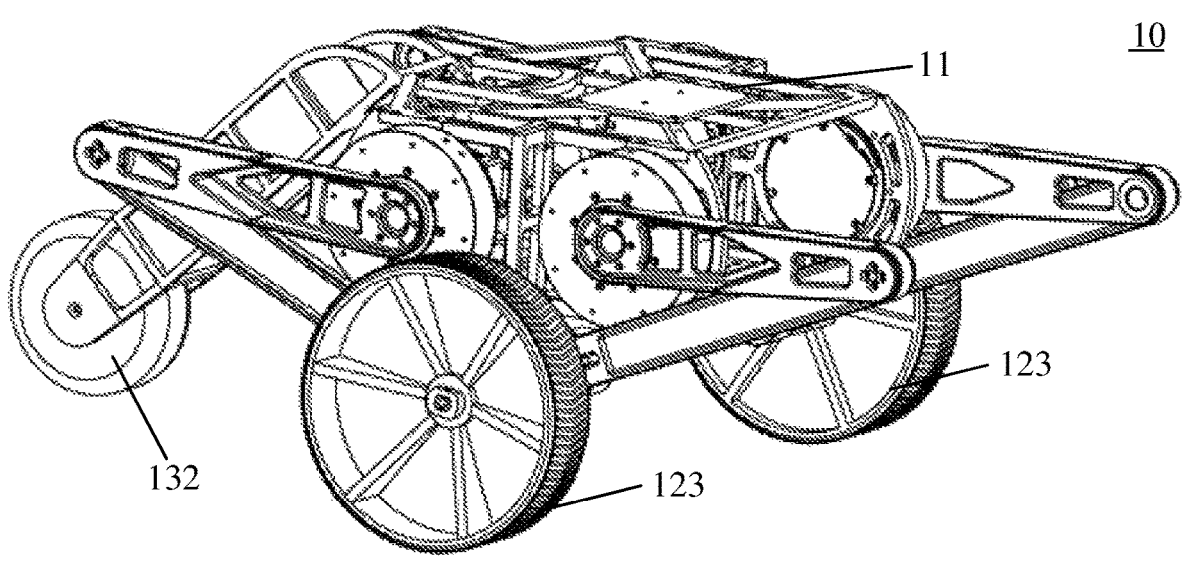
FIG. 11 is another schematic three-dimensional view of a wheel-legged robot standing with three wheels according to an exemplary embodiment of this disclosure.

In an exemplary implementation scenario, the wheel-legged robot 10 may further be in a state of standing with three wheels. When the wheel-legged robot 10 is in the state of standing with three wheels, FIG. 7 to FIG. 9 respectively show a front view, a left view, and a top view of a wheel-legged robot 10 standing with three wheels. FIG. 10 and FIG. 11 respectively show different three-dimensional views of a wheel-legged robot 10 standing with three wheels.

Figure 7:
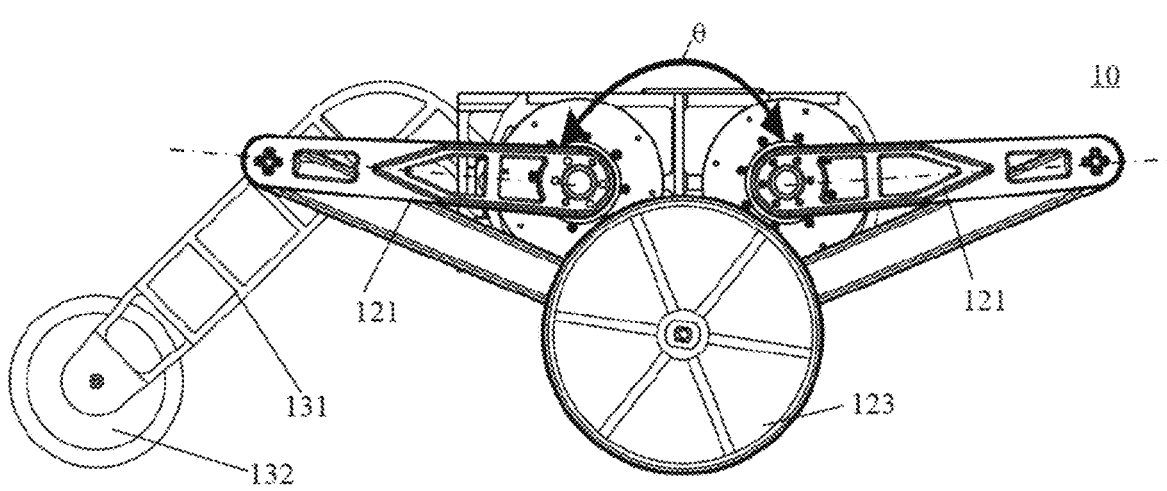
FIG. 7 is a front view of a wheel-legged robot standing with three wheels according to an exemplary embodiment of this disclosure.
Figure 12:
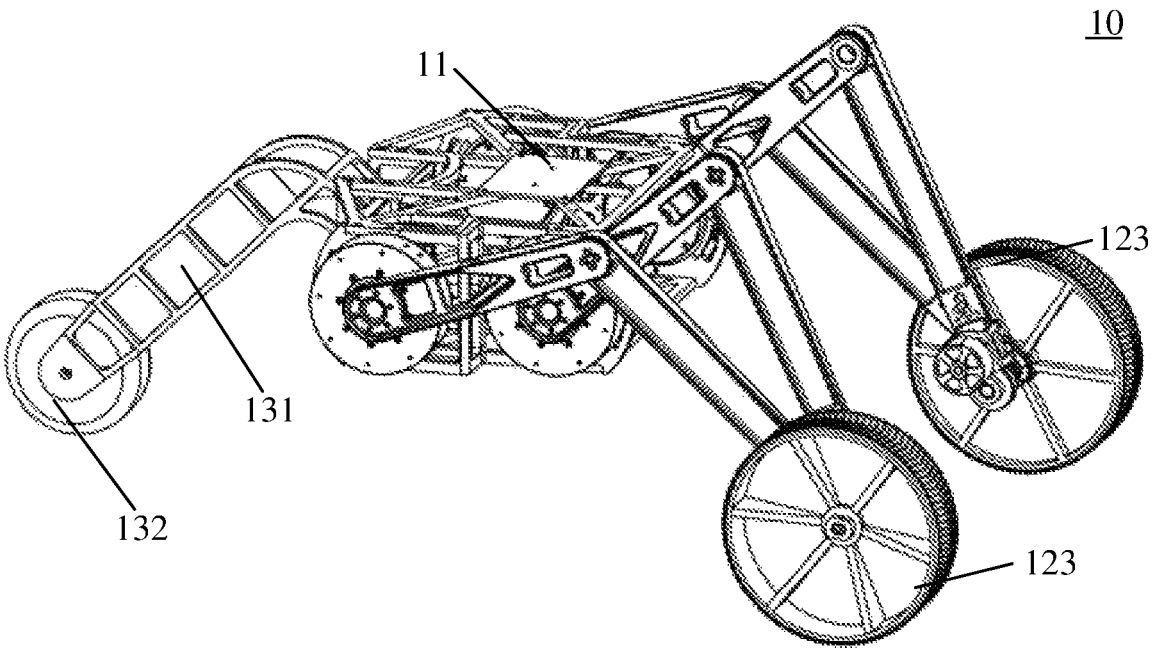
FIG. 12 is a schematic form diagram of a wheel-legged robot according to an exemplary embodiment of this disclosure.

Referring to FIG. 7, a position angle formed by the axis lines of the two rods included by the thigh unit 121 is θ by way of example, and the position angle θ is <180°, and the mechanism may be in a self-stable state. In an exemplary implementation scenario, the wheel-legged robot 10 may further have other forms, and an example of one form is given in FIG. 12.

It is to be understood that the wheel-legged robot 10 is a type of underactuated system robot, and the following embodiments of this application only use the wheel-legged robot 10 as an example. The specific structure and form of the wheel-legged robot 10 may be set according to the actual situation, which does not constitute a limitation on this application.

In order to realize the balance of the wheel-legged robot 10, it is usually necessary to perform balance feedback control on the wheel-legged robot 10. The balance feedback control mainly means that a self-balance measurement value is fed back to a control system, so that the final balance measurement value can reach the standard.

Figure 13:
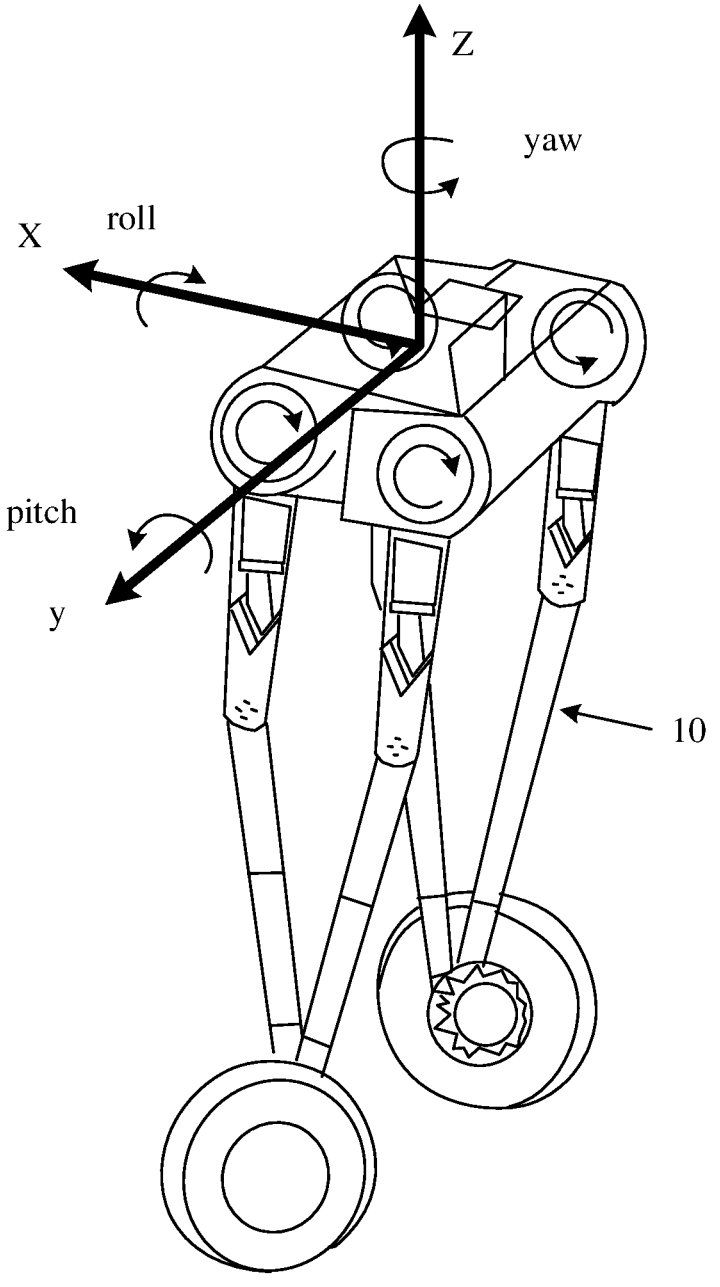
FIG. 13 is a schematic diagram of three space angles according to an exemplary embodiment of this disclosure.

For example, FIG. 13 is a schematic diagram of three space angles according to an exemplary embodiment of this disclosure. The embodiment of this disclosure mainly realizes the balance through three space angles: a pitch angle, a yaw angle, and a roll angle.

Referring to FIG. 13, a right-hand Cartesian coordinate system of a three-dimensional control is established for the wheel-legged robot 10. The pitch angle is an angle of rotation around an x-axis, the x-axis is a coordinate axis in a forward direction of the wheel-legged robot 10, and the corresponding roll angle is expressed by θ later. The yaw angle is an angle of rotation around a y-axis, the y-axis is a coordinate axis in a dual-wheel connection direction of the wheel-legged robot 10, and the corresponding pitch angle is expressed by $\phi$ later. The roll angle is an angle of rotation around the z-axis, the z-axis is a coordinate axis in a vertical upward direction, and the corresponding yaw angle is expressed by $\varphi$ later.

The balance control in the pitch angle direction is used as an example to describe the balance control.

The angle in the pitch direction indicates a sway amplitude of the wheel-legged robot 10 in the forward direction, that is, the angle in the pitch direction indicates the angle at which the wheel-legged robot 10 sways back and forth in the control direction of wheel rotation, because only a single contact point exists between each vehicle wheel and a movement surface, and the wheels of the wheel-legged robot 10 are transversely arranged.

The control in the pitch direction is implemented by a plurality of closed-loop proportional-integral-derivative (PID) controllers. The wheel-legged robot 10 is projected onto a two-dimensional plane to form a simplified two-dimensional plane model. X represents a distance that the wheel center moves transversely in the simplified two-dimensional plane model. Assuming that no wheel slips or leaves the ground, X is equal to the product of the angle of rotation of the wheel and a radius of the wheel.

For example, $\dot{X}$ represents a movement speed of the wheel center, $\dot{X}_{ref}$ represents a reference speed of wheel center movement, and θ represents the pitch angle of the wheel-legged robot 10, that is, the angle of rotation around the direction perpendicular to the paper in the simplified two-dimensional plane model. Correspondingly, $\dot{\theta}$ represents the pitch angle speed of the wheel-legged robot 10, $\dot{\theta}_{ref}$ represents a pitch angle speed reference value of the wheel-legged robot 10, and t represents a torque inputted to a vehicle wheel motor of the wheel-legged robot 10. θ, $\dot{\theta}$, and $\dot{X}$ are collected by a sensor. For example, θ and $\dot{\theta}$ are acquired by an inertial measurement unit (IMU), and $\dot{X}$ is acquired by an encoder sensor of the wheel.

Figure 14:
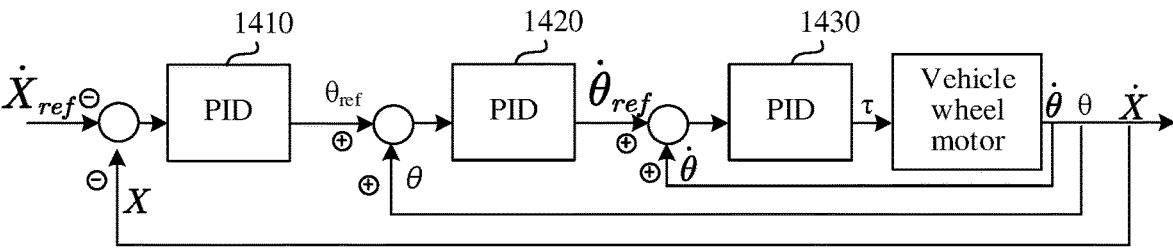
FIG. 14 is a block diagram of balance control in a pitch angle direction according to an exemplary embodiment of this disclosure.

FIG. 14 shows a block diagram of balance control in a pitch direction according to an exemplary embodiment of this disclosure. The outermost control reference quantity is a reference value $\dot{X}_{ref}$ of the movement speed of the wheel center.

First, the reference speed $\dot{X}_{ref}$ of the wheel center movement is acquired, that is, the speed that the wheel needs to reach according to the expected movement, the movement speed $\dot{X}$ of the wheel center is collected by the sensor, a result obtained after $\dot{X}_{ref}$ and the movement speed $\dot{X}$ of the wheel center are subtracted is inputted to the PID controller 1410, and $\dot{\theta}_{ref}$ is obtained through the output of the PID controller 1410.

Secondly, $\theta_{ref}$ is used as the control reference quantity for a next control loop. After $\theta_{ref}$ and $\theta$ are subtracted, a pitch angle difference is obtained, that is, a difference between a current pitch angle and a reference pitch angle, and the pitch angle difference is inputted to the PID controller 1420, to obtain $\dot{\theta}_{ref}$. Subsequently, $\dot{\theta}_{ref}$ is used as the control reference quantity for the next control loop, the result obtained after the subtraction of $\dot{\theta}_{ref}$ and $\dot{\theta}$ is inputted to the PID controller 1430, and $\tau$ is obtained through the output of the PID controller 1430. The balance control of the robot can be implemented by transmitting $\tau$ to the wheel motor of the wheel-legged robot 10.

In addition, after the state of the wheel-legged robot 10 changes correspondingly, values of $\theta$, $\dot{\theta}$, and $\dot{X}$ change correspondingly, and these values are acquired by sensors and used in a new round of control of the wheel-legged robot 10, thereby forming closed-loop control.

$\tau$ obtained according to the above balance control may be used as a wheel rotation reference signal of a type controller of the whole body of the wheel-legged robot 10. A plurality of calculation and generation methods for the reference signal are provided. This application is only an illustrative example, and other calculation and generation methods for obtaining t do not limit this application.

For example, the balance control of the yaw angle and the roll angle in the roll direction is similar to that in the pitch direction of the pitch angle, which may be used as reference, and the details are not described again.

Based on the foregoing content, this disclosure provides a movement control method for an underactuated system robot, which can enable the underactuated system robot to maintain a loaded object on a base portion.

Figure 15:
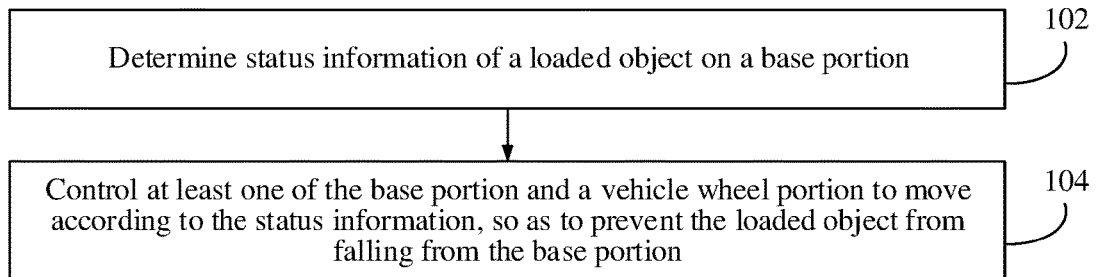
FIG. 15 is a flowchart of a movement control method for an underactuated system robot according to an exemplary embodiment of this disclosure.

FIG. 15 shows a flowchart of a movement control method for an underactuated system robot according to an exemplary embodiment of this disclosure. The underactuated system robot includes a vehicle wheel portion and a base portion coupled to the vehicle wheel portion, and a loaded object is placed on the base portion.

The method is implemented by a controller of the underactuated system robot, and the movement control of the underactuated system robot can be implemented by the controller. For example, after the movement mode of the vehicle wheel portion and/or the base portion is determined, the controller respectively transmits control information to different motors to control the movement of the vehicle wheel portion and/or the base portion.

It is to be understood that the controller may be arranged inside the underactuated system robot, for example, implemented as an internal actuator of the underactuated system robot. Alternatively, the controller may be arranged in an external device, for example, implemented as a remote controller of an underactuated system robot, implemented as a terminal device (such as a computer device) that performs command control on the underactuated system robot, or the like. Alternatively, the controller may further be implemented as other devices, or an execution component in other devices, and the details are not described again.

For example, the movement control method provide in the embodiment of this disclosure includes the following steps.

Step 102: Determine status information of a loaded object on a base portion.

For example, the loaded object is in physical contact with the base portion, but the loaded object has no form closure and force closure on the base portion.

During the movement of the underactuated system robot, a contact point between the loaded object and the base portion is not fixed, which causes the movement state of the loaded object to have no clear rules. However, since the loaded object is placed on the base portion, the underactuated system robot may consider the physical characteristics of the loaded object during the movement, such as mass and moment of inertia, and different physical parameters generate great differences in the interaction between the loaded object and the underactuated system robot.

The loaded object may be any object, including a rigid object and an elastic object. A shape, a material, a size, and a structure of the loaded object are not limited in this application, and any one or more objects may be regarded as the loaded object involved in this application. When a plurality of objects are regarded as loaded objects involved in this application, the status information of each object on the base portion may be determined separately. Physical information of the plurality of objects may also be processed to determine overall status information.

The loaded object may be a regular or irregular object such as a cube, a cuboid, a cylinder, a sphere, or the like. If the loaded object is a cube, less friction exists between the cube and the base portion, so that the cube slides on the base portion.

The loaded object is a sphere by way of example in the following embodiments.

For example, the status information of the loaded object on the base portion includes at least one of attitude information of the loaded object, movement information of the loaded object, physical information of the loaded object, attitude information of the base portion, movement information of the base portion, and physical information of the base portion. The attitude information of the loaded object is used for indicating a position of the loaded object on the base portion. The movement information of the loaded object includes but is not limited to displacement information, speed information, and acceleration information of the loaded object. The physical information of the loaded object includes but is not limited to parameter information related to the physical characteristics of the loaded object, such as the mass and moment of inertia of the loaded object. For the attitude information, the movement information, and the physical information of the base portion, reference may be made to the above contents, and the details are not described again.

For example, the status information includes: a displacement of a contact point of the loaded object on the base portion in an x direction relative to a center of mass of the underactuated system robot on the base portion, and a movement speed of the contact point on the base portion in the x direction. For another example, the status information includes: a displacement of a contact point of the loaded object on the base portion in an x direction relative to the center of mass of the underactuated system robot on the base portion, a movement speed of the contact point on the base portion in the x direction, an inclination angle of the base portion, and an inclination angle speed of the base portion.

The x direction is the x-axis direction in the foregoing content, and the x-axis is the coordinate axis in the forward direction of the wheel-legged robot, which corresponds to the roll angle. Exemplarily, the status information may further include relevant information in the y direction, the y direction is the y-axis direction in the foregoing content, and the y-axis is the coordinate axis in the dual-wheel connection direction of the wheel-legged robot 10, which corresponds to the pitch angle.

In an exemplarily implementation scenario, the status information may be obtained through at least one auxiliary component of a tactile sensor, a pressure sensor, an action capture system, and a camera (which will be described in detail below). For example, step 102 may be implemented by: acquiring position information of the loaded object on the base portion through the tactile sensor; and performing contact position coordinate transformation according to the position information to determine the status information.

The movement control method for an underactuated system robot provided based on the embodiment of this disclosure is performed by the controller of the underactuated system robot. When movement control is needed, the controller issues an instruction to at least one auxiliary component of the tactile sensor, the pressure sensor, the action capture system, and the camera to acquire the position information of the loaded object on the base portion. Subsequently, at least one auxiliary component reports the position information of the loaded object on the base portion to the controller, and the controller determines the status information according to the position information. Alternatively, the position information may be processed by at least one auxiliary component to obtain status information, and then the status information is reported to the controller for further processing by the controller.

Step 104: Control at least one of the base portion or the vehicle wheel portion to move according to the status information, so as to prevent the loaded object from falling from the base portion.

For example, the keeping the loaded object from falling from the base portion includes but is not limited to at least one of the following situations: the loaded object remains stationary on the base portion, moves on the base portion, rotates on the base portion, bounces on the base portion, and rolls on the base portion. The loaded object is a sphere by way of example. The sphere remains stationary, rolling, or bouncing on the base portion, all of which may be regarded that the sphere is maintained on the base portion.

In this disclosure, the movement state of the underactuated system robot is selected according to the actual needs, which is not limited. The movement state of the underactuated system robot includes but is not limited to at least one of a stationary state, a moving state, a flipping state, a dancing state, a jumping state, a static balancing state, or a dynamic balancing state.

For example, when the underactuated system robot is in a stationary state, the vehicle wheel portion keeps the base portion at a fixed position relative to the ground. For another example, when the underactuated system robot is in a moving state, the vehicle wheel portion moves to keep a body of the underactuated system robot balanced. For another example, when the underactuated system robot is in the flipping state, a relative position of the vehicle wheel portion and the base portion varies with different flipping stages. For another example, when the underactuated system robot is in the dancing state, the vehicle wheel portion moves or moves inclinedly, and/or the base portion moves or move inclinedly.

In some embodiments, in the static balancing state, the body of the underactuated system robot is not displaced, and the base portion can be kept stationary or move inclinedly, so that the underactuated system robot is in a balanced state in situ, which may be considered that the underactuated system robot is in a relatively static state. It is to be understood that in the static balancing state, the vehicle wheel portion may shake slightly in situ, which is caused by the whole-body dynamics model of the underactuated system robot. Any shaking within the error range may be regarded as that the vehicle wheel portion remains in situ, and the error range may be set according to actual needs.

In some other embodiments, in the dynamic balancing state, the body of the underactuated system robot is displaced, the vehicle wheel portion moves, and the base portion can be kept stationary or move inclinedly, so that the underactuated system robot is in a balanced state during the displacement.

The movement state of the underactuated system robot is the dynamic balancing state by way of example. In the control process of the underactuated system robot, the underactuated system robot moves in any direction to ensure body balance. In this case, the loaded object is placed on the base portion, and after the status information of the loaded object on the base portion is determined, the at least one of the base portion or the vehicle wheel portion is controlled to move according to the determined status information, so as to ensure that the underactuated system robot can keep the loaded object on the base portion while realizing the body balance.

For example, the movement of the base portion includes at least inclined movement, and the continuous inclined movement of the base portion may cause the base portion to be in a swaying state, such as nodding or shaking a head of the base portion. The movement of the vehicle wheel portion includes at least moving movement and inclined movement, for example, the movement of the vehicle wheel portion toward a forward direction.

After the status information of the loaded object on the base portion is determined, the at least one of the base portion or the vehicle wheel portion according to the status information can be controlled by the whole-body dynamics control of the underactuated system robot.

The whole-body dynamics control is implemented by a balance controller by way of example. The status information is inputted into the balance controller of the underactuated system robot, and a generated relevant reference signal for the whole-body dynamics control is outputted through the corresponding whole-body dynamics model to drive the at least one of the base portion or the vehicle wheel portion. The relevant reference signal includes but is not limited to at least one of the following signals: a reference signal of wheel rotation, a reference signal of a base portion attitude, and a reference signal of a tail portion attitude. The output of the balance controller is torque information of each joint, and the movement of the base portion and/or the vehicle wheel portion may be determined according to the determined torque information. Exemplarily, the balance controller is a PID controller.

For example, after the status information is determined, the controller of the underactuated system robot determines the relevant reference signal for the whole-body dynamics control based on a balance processor. Subsequently, the controller transmits the relevant reference signal to the base portion and/or the vehicle wheel portion, so that the base portion and/or the vehicle wheel portion can move according to the transmitted signal. For example, the controller transmits the torque information of each joint of the vehicle wheel portion to the corresponding motor, so that the motor controls the corresponding joint based on the corresponding torque information, thereby realizing the movement of the vehicle wheel portion.

Based on the above, according to the movement control method for an underactuated system robot provided in the embodiment of this disclosure, the underactuated system robot can control the base portion and/or the vehicle wheel portion to move through the controller according to the status information of the loaded object on the base portion, to prevent the loaded object from falling from the base portion, thereby improving the stability of the underactuated system robot.

According to the foregoing content, a plurality of movement states of the underactuated system robot are provided. The movement state is a dynamic balancing state by way of example. The underactuated system robot needs to keep the body balance and prevent the loaded object from falling from the base portion.

Figure 16:
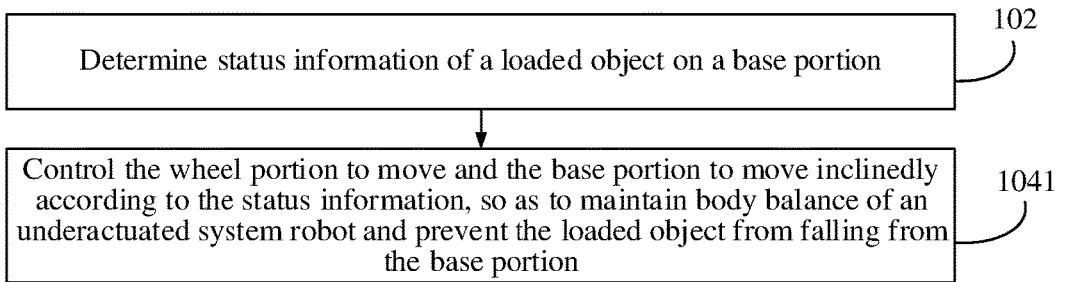
FIG. 16 is a flowchart of a movement control method for an underactuated system robot according to an exemplary embodiment of this disclosure.

Based on FIG. 15, FIG. 16 is a flowchart of a movement control method for an underactuated system robot according to an exemplary embodiment of this disclosure. Exemplarily, the vehicle wheel portion includes a leg portion and a wheel portion, and step 104 may be implemented as step 1041. Details of step 1041 are as follows.

Step 1041: Control the wheel portion to move and the base portion to move inclinedly according to the status information to maintain body balance of the underactuated system robot and prevent the loaded object from falling from the base portion.

The inclined movement of the base portion and the movement of the wheel portion interact with each other through stretching/retraction of the leg portion.

For example, the movement of the wheel portion includes at least moving movement and inclined movement. For example, the wheel portion moves in a forward direction. For another example, when passing an obstacle, the wheel portion moves inclinedly, so that the body of the underactuated system robot inclines to avoid the obstacle.

Referring to FIG. 1, the wheel portion may include a driving wheel 123, and the second driving motor 1242 provides a driving force to the driving wheel 123, so that the driving wheel 123 performs moving movement and inclined movement. For example, the second driving motor 1242 drives the driving wheel 123 to move forward or backward in the forward direction of the underactuated system robot 10. Alternatively, the second driving motor 1242 drives the driving wheel 123 to be inclined, so that an included angle between the driving wheel 123 and the ground changes, thereby driving the body of the underactuated system robot 10 to be inclined.

For example, the movement of the base portion includes at least inclined movement, and the continuous inclined movement of the base portion may cause the base portion to be in a swaying state.

For example, referring to FIG. 13, the x-axis in the foregoing content is used as an example. The base portion is continuously inclined up and down around the x-axis, so that the base portion is in a swaying state in the x-axis direction. If the x-axis is the forward direction of the wheel-legged robot 10, the inclined movement of the base portion may be regarded as a nodding action of the base portion. For another example, the y-axis in the foregoing content is used as an example. The base portion is continuously inclined up and down around the y-axis, so that the base portion is in a swaying state in the y-axis direction. If the y-axis is a dual-wheel connection direction of the wheel-legged robot 10, the inclined movement of the base portion may be regarded as a shaking action of the base portion.

The loaded object is a sphere by way of example. The sphere is enclosed without form closure and force closure on the base portion. In the control process of the underactuated system robot, the balance controller keeps body balance of the underactuated system robot by controlling the movement of the vehicle wheel portion and keeps the sphere from falling from the base portion by controlling the movement of the base portion.

For example, the inclined movement of the base portion and the movement of the wheel portion interact with each other through stretching/retraction of the leg portion. The inclined movement of the base portion affects the movement of the wheel portion through the leg portion, and the movement of the wheel portion affects the inclined movement of the base portion through the leg portion.

Referring to FIG. 1, the leg portion includes a thigh unit 121 and a calf unit 122, and the wheel portion includes a driving wheel 123, for example. When the base portion 11 moves inclinedly, the base portion 11 affects the forward and/or backward movement of the driving wheel 123 through stretching/retraction of the thigh unit 121 and the calf unit 122. When the driving wheel 123 moves forward and/or backward, the driving wheel 123 drives the calf unit 122 and the thigh unit 121 to stretch/retract in sequence, thereby affecting the left-right sway and/or the back-and-forth sway of the base portion 11.

The movement of the vehicle wheel portion and the inclined movement of the base portion can be realized through the whole-body dynamics control of the underactuated system robot, and each joint of the underactuated system robot is controlled according to the reference signal outputted by the controller, so as to implement the movement control of the vehicle wheel portion and the base portion. This part is to be described in detail later, and is only an example description herein.

Based on the above, according to the movement control method for an underactuated system robot provided in the embodiment of this disclosure, a plurality of movement states of underactuated system robot are given, to prevent the loaded object from falling from the base portion, thereby improving the stability of the underactuated system robot.

In an exemplary implementation scenario, the loaded object and/or the underactuated system robot is to be subject to external interference. Based on this, step 1041 can be implemented as follows.

The wheel portion is controlled to move and the base portion is controlled to move inclinedly according to the status information when the loaded object and/or the underactuated system robot is subject to external interference to maintain body balance of the underactuated system robot and prevent the loaded object from falling from the base portion.

The external interference to the loaded object and/or the underactuated system robot may be a force applied by other objects to the loaded object and/or the underactuated system robot, or may be the resistance encountered by the underactuated system robot when crossing or passing an obstacle. For example, when the underactuated system robot passes the obstacle, some entities of the obstacle squeeze the base portion, so that the underactuated system robot and the loaded object are simultaneously squeezed.

For example, the external interference includes at least one of the following: a center of the loaded object is subject to external interference; a part of the loaded object other than the center is subject to external interference; a center of mass of the loaded object is subject to external interference; a circumferential side of the center of mass of the loaded object is subject to external interference; the base portion is subject to external interference; and the vehicle wheel portion is subject to external interference.

Figure 17:
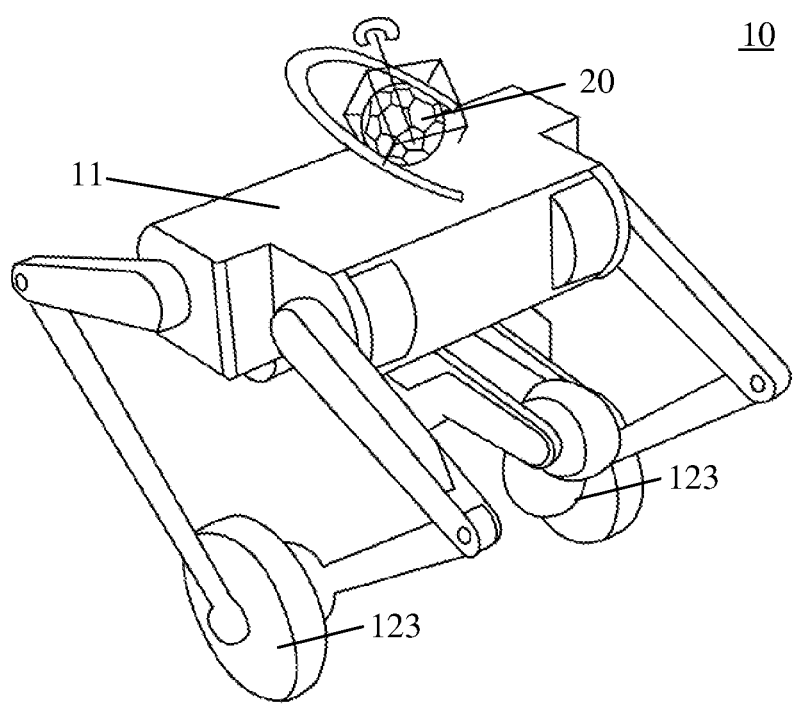
FIG. 17 is a diagram showing implementation of movement control for an underactuated system robot under external interference according to an exemplary embodiment of this disclosure.
Figure 18:
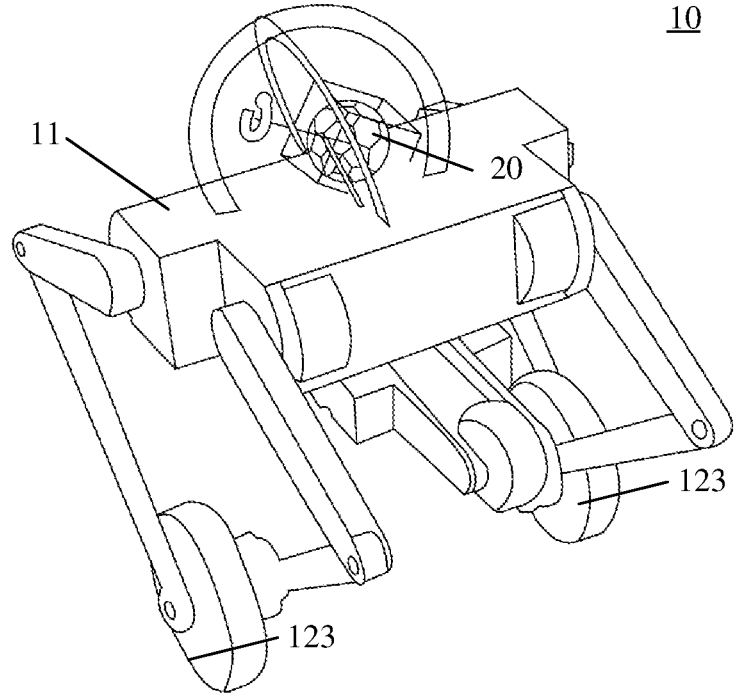
FIG. 18 is a diagram showing implementation of movement control for an underactuated system robot under external interference according to an exemplary embodiment of this disclosure.
Figure 19:
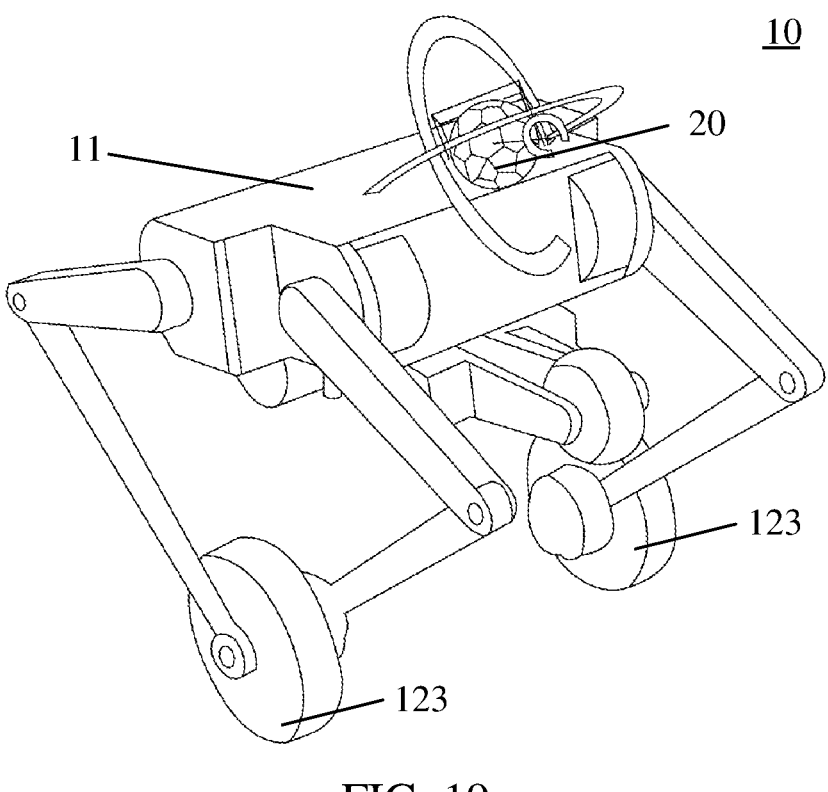
FIG. 19 is a diagram showing implementation of movement control for an underactuated system robot under external interference according to an exemplary embodiment of this disclosure.

FIG. 17 to FIG. 19 are diagrams showing implementation of movement control for an underactuated system robot under different external interference according to an exemplary embodiment of this disclosure.

The underactuated system robot is a wheel-legged robot 10 by way of example. The driving motor of the wheel-legged robot 10 provides a driving force to two driving wheels 123 included by the vehicle wheel portion 12 (not shown), so that the wheel-legged robot 10 is in a dynamic balancing state. The two driving wheels 123 are the wheel portions of the vehicle wheel portion 12, the loaded object 20 is placed on the base portion 11, and the wheel-legged robot 10 controls at least one of the base portion 11 or the driving wheels 123 to move, so as to keep the loaded object 20 from falling from the base portion 11.

Alternatively, the loaded object 20 is a sphere.

Referring to FIG. 17, an external interference is added to the center of the sphere, so that the loaded object 20 does not fall after rolling on the base portion 11, and the wheel-legged robot 10 still remains balanced. In the process of maintaining balance, the base portion 11 performs closed-loop control in different attitude angle directions.

Referring to FIG. 18, an external interference is added to other positions rather than the center of the sphere, so that the loaded object 20 does not fall after rolling on the base portion 11, and the wheel-legged robot 10 still remains balanced. In the process of maintaining balance, the base portion 11 also performs closed-loop control in different attitude angle directions.

Referring to FIG. 19, a torque is added around the center of mass of the loaded object 20, so that the loaded object 20 does not fall after rolling on the base portion 11, and the wheel-legged robot 10 still remains balanced. In the process of maintaining balance, the base portion 11 also performs closed-loop control in different attitude angle directions.

Exemplarily, when the loaded object and/or the underactuated system robot is to be subject to external interference, there is a higher possibility that the loaded object and/or the underactuated system robot is to be subject to greater external interference. In this case, a possibility that the loaded object 20 cannot be maintained on the base portion 11 exists only by the movement of the base portion 11. In this case, the wheel-legged robot 10 controls the driving wheel 123 to move, for example, forward or backward in the wheel rotation direction, so as to keep the loaded object 20 on the base portion 11.

In this case, the balance controller of the wheel-legged robot 10 needs to consider control reference signals of both the base portion 11 and the vehicle wheel portion 12, so that the movement of the vehicle wheel portion 12 can assist the movement of the base portion 11, and the loaded object 20 can be maintained on the base portion 11. It is to be understood that the movement of the vehicle wheel portion 12 and the base portion 11 can be implemented by the controller of the wheel-legged robot 10. For the specific implementation, reference may be made to the foregoing contents, and the details are not described again.

Exemplarily, step 1041 may be implemented by:
controlling the wheel portion to move forward in a first direction according to the status information when the loaded object moves on the base portion in the first direction; or controlling one side of the base portion relatively close to the first direction to lift and the other side of the base portion relatively away from the first direction to fall according to the status information when the loaded object moves in the first direction; or controlling the wheel portion to move forward in the first direction and controlling the one side of the base portion relatively close to the first direction to lift and the other side of the base portion relatively away from the first direction to fall according to the status information when the loaded object moves in the first direction.

Referring to FIG. 17 to FIG. 19, the loaded object 20 rolls on the base portion 11, and the first direction is a rolling forward direction of the loaded object 20 by way of example. The loaded object 20 rolls in the first direction. In order to keep the loaded object 20 from falling from the base portion 11, the underactuated system robot 10 may perform one of the following three controlling operations.

1. The driving wheel 123 is controlled to move, so that the driving wheel 123 moves forward in the rolling forward direction of the loaded object 20.

2. The underactuated system robot 10 may control a side of the base portion 11 relatively close to the rolling forward direction of the loaded object 20 to lift and the other side away from the rolling forward direction of the loaded object 20 to fall, so that the base portion 11 performs inclined movement.

3. When the loaded object 20 rolls at a relatively high speed, or is subject to relatively great external interference, the underactuated system robot 10 may control, by controlling the driving wheel 123 to move, a side of the base portion 11 relatively close to the rolling forward direction of the loaded object 20 to lift and the other side relatively away from the rolling forward direction of the loaded object 20 to fall.

Through the movement of the driving wheel 123 and/or the lifting and falling of two sides of the base portion 11, the body of the underactuated system robot 10 is kept balanced, and the loaded object 20 is prevented from falling from the base portion 11. For example, the driving wheel 123 accelerates in the rolling direction of the loaded object 20, and the base portion 11 remains stationary. For another example, the driving wheel 123 remains stationary, and two sides of the base portion 11 are lifted or lowered according to the rolling forward direction of the loaded object 20, so that the base portion 11 is inclined and sways. For another example, the driving wheel 123 moves in cooperation with the base portion 11, so that the underactuated system robot 10 moves forward in the rolling forward direction of the loaded object 20, and the base portion 11 is in a swaying state.

Based on the above, according to the movement control method for an underactuated system robot provided in the embodiments of this disclosure, the vehicle wheel portion is controlled to move and the base portion is controlled to move inclinedly through the controller according to the status information of the loaded object on the base portion, so as to keep the body balance of the underactuated system robot and prevent the loaded object from falling from the base portion.

Exemplarily, when the loaded object and/or the underactuated system robot is subject to external interference, the underactuated system robot can still achieve the goal of keeping the body balance of the underactuated system robot and keeping the loaded object from falling from the base portion.

Exemplarily, the embodiment of this disclosure further provides a plurality of possibilities of external interference. It is to be understood that the plurality of possibilities are only schematic examples. Other possibilities that the loaded object and/or the underactuated system robot may be subject to torque impact are all within the protection scope of this disclosure, and the details are not described again.

Figure 20:
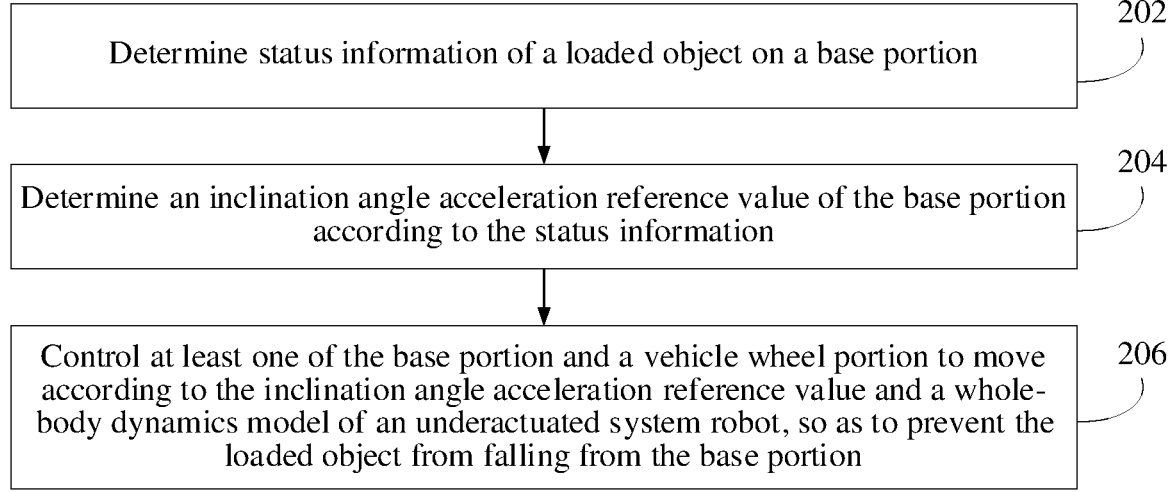
FIG. 20 is a flowchart of a movement control method for an underactuated system robot according to an exemplary embodiment of this disclosure.

Based on the foregoing content, FIG. 20 is a flowchart of a movement control method for an underactuated system robot according to an exemplary embodiment of this disclosure. The method is performed by a controller of the underactuated system robot. The underactuated system robot includes a vehicle wheel portion and a base portion coupled to the vehicle wheel portion. A loaded object is placed on the base portion. The movement control method provided in the embodiment of this disclosure includes the following steps.

Step 202: Determine status information of a loaded object on a base portion.

For example, the loaded object is in physical contact with the base portion, but the loaded object has no form closure and force closure on the base portion. The loaded object may be any object, including a rigid object and an elastic object. A shape, a material, a size, and a structure of the loaded object are not limited in this disclosure, and any one or more objects may be regarded as the loaded object involved in this disclosure.

For example, step 202 is the same as step 102, which may be used as reference, and details are not described again.

Step 204: Determine an inclination angle acceleration reference value of the base portion according to the status information.

For the status information, reference may be made to the foregoing contents, and the details are not described again.

For example, the inclination angle acceleration reference value of the base portion may be used as an attitude reference signal of the base portion to realize the control of the base portion. For example, the controller of the underactuated system robot may determine the corresponding inclination angle acceleration reference value through different control laws according to the different contents of the status information.

Information such as an inclination direction, an inclination angle, and an inclination angle speed of the base portion may be determined according to the inclination angle acceleration reference value. Based on the foregoing information, the base portion moves inclinedly toward a target inclination direction at a target inclination angle speed until the target inclination angle is reached.

Figure 21:
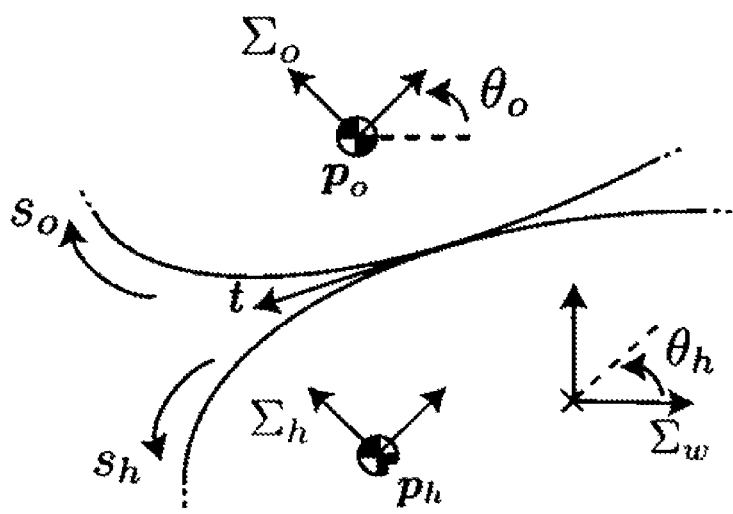
FIG. 21 is a schematic diagram showing common problems when grasping an object by hand according to an exemplary embodiment of this disclosure.

In order to describe the interaction between the loaded object and the base portion, reference is made to the schematic diagram for describing common problems when grasping an object by hand shown in FIG. 21. The lower arc represents a curved surface of a finger when a hand grasps an object, and an arc length of the curved surface is represented by $S_h$. The above curve represents the surface curve of the grabbed object, and an arc length corresponding to a projection of the curve on the plane is represented by S.

For example, a coordinate system of a hand is represented by a subscript H, a coordinate system of the object is represented by a subscript o, and the world coordinate system is represented by $\Sigma_w$. Based on this, $p_h$ represents an origin position of the hand coordinate system $\Sigma_h$ relative to the world coordinate system $\Sigma_w$. $\theta_h$ represents an attitude change of the hand coordinate system $\Sigma_h$ relative to the world coordinate system $\Sigma_w$. Similarly, $p_o$ represents the origin position of the object coordinate system $\Sigma_o$ relative to the world coordinate system $\Sigma_w$, and $\theta_o$ represents the attitude change of the object coordinate system $\Sigma_o$ relative to the world coordinate system $\Sigma_w$. t is a tangent direction of a tangent point between the object and the hand.

It is to be understood that FIG. 21 is equivalent to providing a set of general methods. During the use of the general method, the hand and the object can be replaced by others, such as the base portion and the loaded object. Exemplarily, an upper surface of the base portion is not a plane, and the loaded object is an object with an irregular shape. The method in the embodiment of the application is an exemplary use of the general method.

Figure 22:
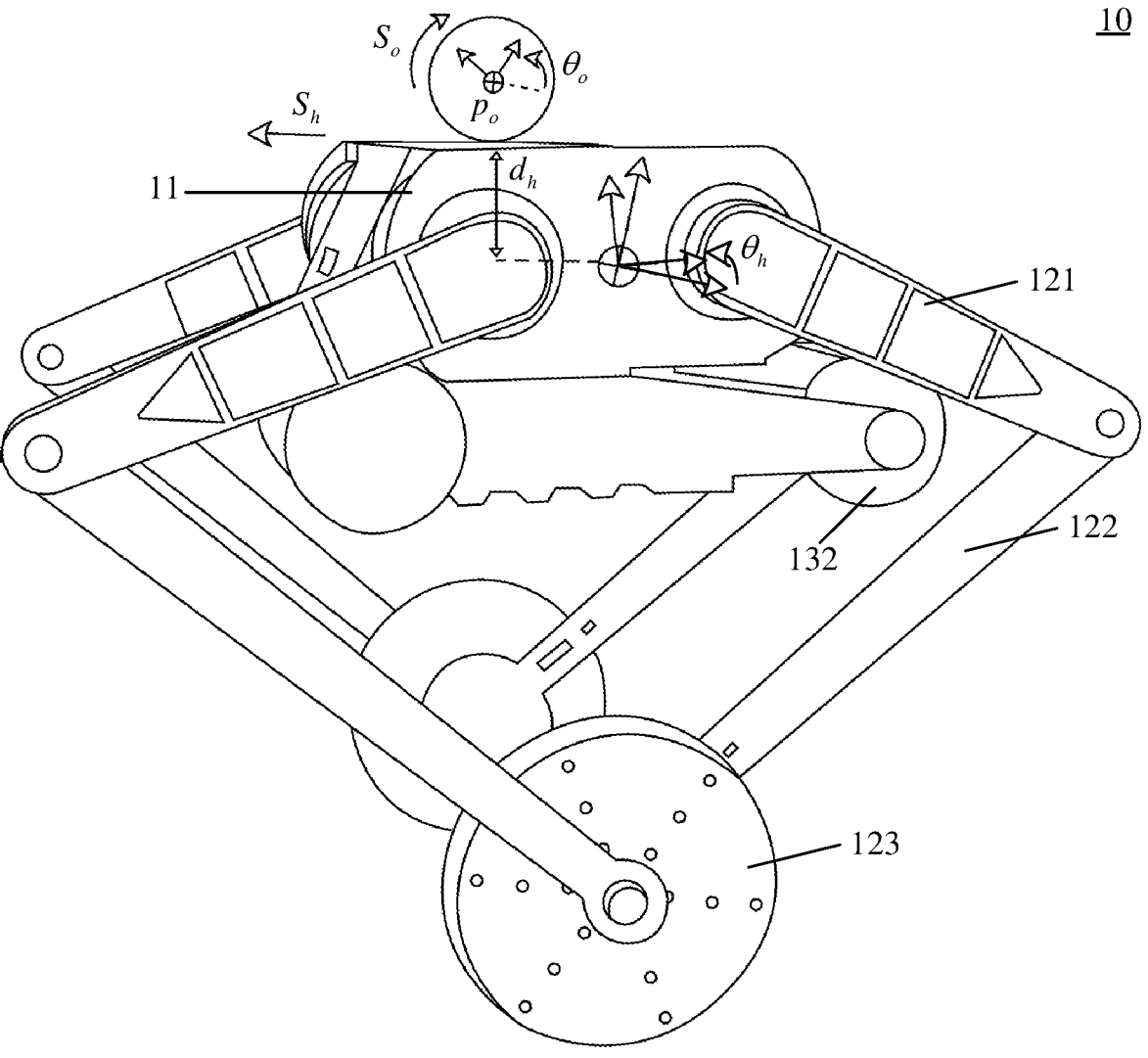
FIG. 22 is a schematic diagram of scalar definition of an underactuated system robot according to an exemplary embodiment of this disclosure.

Based on FIG. 21, the loaded object is a sphere by way of example. FIG. 22 is a schematic diagram of scalar definition of an underactuated system robot according to an exemplary embodiment of this disclosure. For the convenience of identification, a curved surface of a loaded object is standardized as a standard sphere, and a circle in FIG. 22 is a tangent plane corresponding to the sphere. For an x direction, a y direction, and a z direction appearing in the following, reference is made to the directions given in the foregoing contents. When an upper surface of a base portion 11 of a wheel-legged robot 10 contacts the sphere, a distance in the z direction between a straight line where the upper surface contacts the sphere and a center of mass of the robot is expressed as $d_h$.

According to the foregoing content, the contents of the status information of the loaded object on the base portion 11 are different. For example, the status information includes a displacement of a contact point of the loaded object on the base portion 11 in a target direction relative to the center of mass of the underactuated system robot 10 on the base portion 11, a movement speed of the contact point on the base portion 11 in the target direction, an inclination angle of the base portion 11, and an inclination angle speed of the base portion 11. $S_h$ represents the displacement of the contact point on the base portion 11 in the target direction relative to the center of mass of the underactuated system robot 10, $\dot{S}_h$ represents the movement speed of the contact point on the base portion 11 in the target direction, $\theta_h$ represents the inclination angle of the base portion 11, and $\dot{\theta}_h$ represents the inclination angle speed of the base portion 11. The target direction may be the x direction and/or the y direction, and the rotation in the x direction or the y direction may be used as reference of the change of the base portion 11 in the z direction.

The inclination angle acceleration reference value of the base portion 11 can be determined according to one or more of the above displacement, the movement speed, the inclination angle, and the inclination angle speed. For example, the inclination angle acceleration reference value is determined by a difference between the displacement, the movement speed, the inclination angle, and the inclination angle speed and the corresponding preset value.

The target direction is respectively the x direction and the y direction by way of example. A matrix of the inclination angle acceleration reference value of the base portion 11 may be obtained according to step 204. The matrix may be used in the whole-body dynamics control of the underactuated system robot 10. The use of the matrix in the whole-body dynamics model is described in detail below.

Step 206: Control at least one of the base portion or a vehicle wheel portion to move according to the inclination angle acceleration reference value and a whole-body dynamics model of the underactuated system robot, so as to prevent the loaded object from falling from the base portion.

For the loaded object being prevented from falling from the base portion, and the control of the base portion and/or the vehicle wheel portion, reference may be made to the foregoing contents, and details are not described again.

The whole-body dynamics model of the underactuated system robot is configured to implement the whole-body dynamics control of the underactuated system robot. The inclination angle acceleration reference value is an input value of the model, and the control reference signal of the underactuated system robot can be determined according to the inclination angle acceleration reference value and the whole-body dynamics model, to implement the control of the base portion and/or the vehicle wheel portion.

For example, after the inclination angle acceleration reference value is determined, the controller of the underactuated system robot inputs the matrix of the inclination angle acceleration reference value of the base portion into a balance controller, acquires torque information of the base portion and/or the vehicle wheel portion according to the whole-body dynamics model, and controls the base portion and/or the vehicle wheel portion to move correspondingly according to the torque information.

Based on the above, the movement control method for an underactuated system robot provided in the embodiment of this disclosure provides an optional determination manner of the control information of the base portion and/or the vehicle wheel portion. The inclination angle acceleration reference value of the base portion is determined based on the status information of the loaded object on the base portion, and the control information is determined based on the value and the whole-body dynamics model, so as to realize the control of the base portion and/or the vehicle wheel portion.

Figure 23:
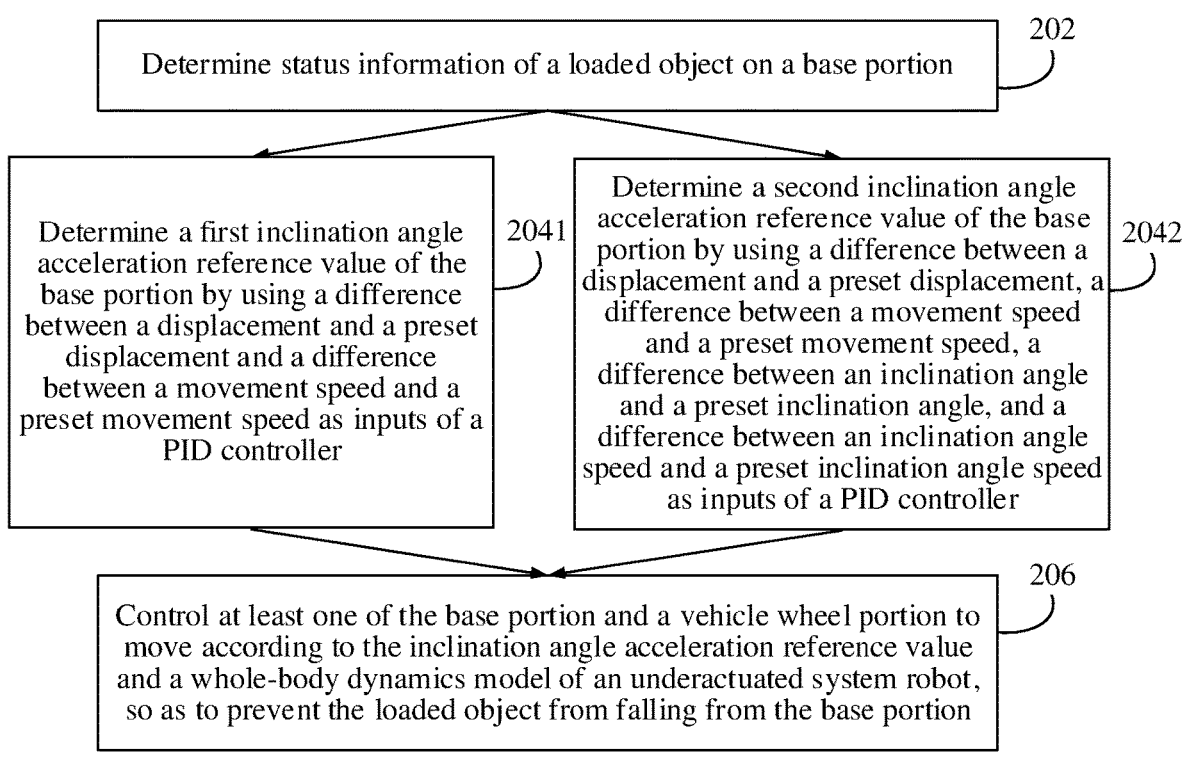
FIG. 23 is a flowchart of a movement control method for an underactuated system robot according to an exemplary embodiment of this disclosure.

Exemplarily, the embodiment of this disclosure further provides two different calculation methods of the inclination angle acceleration reference value. Based on FIG. 20, FIG. 23 is a flowchart of a movement control method for an underactuated system robot according to an exemplary embodiment of this disclosure. Step 204 may be implemented as step 2041 or step 2042, and step 2041 and step 2042 are performed alternatively, which is specifically as follows.

1. Calculation of First Inclination Angle Acceleration Reference Value.

The status information includes: a displacement S, of a contact point of the loaded object on the base portion in a target direction relative to a center of mass of the underactuated system robot on the base portion, and a movement speed S, of the contact point on the base portion in the target direction, for example. Step 204 may be implemented as step 2041, which is specifically as follows.

Step 2041: A first inclination angle acceleration reference value of the base portion is determined by using a difference between the displacement and a preset displacement and a difference between the movement speed and a preset movement speed as inputs of a PID controller.

The preset displacement is represented by $$S_h^{ref},$$

and the preset movement speed is represented by $$\dot{S}_h^{ref}.$$

Exemplarily, at least one of $$S_h^{ref}$$

and $$\dot{S}_h^{ref}$$

is determined according to a structural feature of the underactuated system robot.

In an exemplary implementation scenario, front, rear, left, and right dimensions of the underactuated system robot are completely symmetrical, and a center of mass becomes a geometric center, so that the preset values $$S_h^{ref}$$

and $$\dot{S}_h^{ref}$$

can be set to 0. In another exemplary implementation scenario, the front, rear, left, and right dimensions of the underactuated system robot are not completely symmetrical. If the center of mass and the geometric center are not the same, the preset values $$S_h^{ref}$$

and $$\dot{S}_h^{ref}$$

may be set according to the structural feature of the underactuated system robot to correct the error caused by the deviation of the center of mass from the geometric center.

For example, weights of the underactuated system robot on left and right sides are asymmetric, which causes the center of mass to deviate from the geometric center. In this case, the position of the center of gravity of the underactuated system robot may be determined by simulation or real machine measurement, and then a smallest motor joint torque required when the underactuated system robot and the loaded object are closest to the balanced state as a whole is calculated when the loaded object is at a certain point on the base portion. For example, a value range of $$S_h^{ref}$$

is −5 cm to 5 cm. It is to be understood that the above examples are only exemplary examples, and do not specifically limit the value range of $$S_h^{ref}$$

disclosure.

After the difference between the displacement and the preset displacement and the difference between the movement speed and the preset movement speed are determined, the controller of the underactuated system robot uses the two differences as the inputs of the PID controller, and the corresponding inclination angle acceleration reference value can be determined through the PID controller, to implement the control of the vehicle wheel portion and/or the base portion.

Exemplarily, step 2041 may be implemented by: determining a first difference according to the displacement and the preset displacement, and determining a second difference according to the movement speed and the preset movement speed; and determining the first inclination angle acceleration reference value by the PID controller according to a product of a first parameter and the first difference and a sum of products of a second parameter and the second difference. The first parameter is a reference value of a proportional coordination coefficient, and the second parameter is a reference value of a differential adjustment coefficient.

For example, the displacement is $S_h$, the movement speed is $\dot{S}_h$, the preset displacement is $$S_h^{ref},$$

and the preset movement speed is $$\dot{S}_h^{ref}.$$

A first feedback control law for controlling the loaded object to be prevented from falling from the base portion may be expressed as follows:

$$\ddot{\theta}^{des} = k_{p,S_h}\left(S_h^{ref} - S_h\right) + k_{d,S_h}\left(\dot{S}_h^{ref} - \dot{S}_h\right)$$

$\ddot{\theta}^{des}$ is the first inclination angle acceleration reference value, $$k_{p,S_h}$$

is the first parameter, and $$K_{d,S_h}$$

is the second parameter.

The controller of the underactuated system robot can implement the control of the displacement and the movement speed of the loaded object on the base portion according to the first feedback control law, so that the actual displacement of the loaded object is close to $$S_h^{ref}$$

and the movement speed of the loaded object on the base portion is close to $$\dot{S}_h^{ref}.$$

Exemplarily, the first parameter and the second parameter may be set to constant values, and may also be adjusted according to actual needs.

According to the foregoing content, the controller of the underactuated system robot may obtain the inclination angle acceleration reference values in different target directions. For example, when the target direction is the x direction, that is, when considering the plane where the pitch is located, the first inclination angle acceleration reference value of the base portion in the pitch direction may be obtained. For another example, when the target direction is the y direction, that is, when considering the plane where the roll is located, the first inclination angle acceleration reference value of the base portion in the roll direction may be obtained.

2. Calculation of First Inclination Angle Acceleration Reference Value.

The status information includes: a displacement $S_h$ of a contact point of the loaded object on the base portion in a target direction relative to a center of mass of the underactuated system robot on the base portion, and a movement speed $\dot{S}_h$ of the contact point on the base portion in the target direction, for example. Step 204 may be implemented as step 2042, which is specifically as follows.

Step 2042: Determine a second inclination angle acceleration reference value of the base portion by using a difference between the displacement and a preset displacement, a difference between the movement speed and a preset movement speed, a difference between the inclination angle and a preset inclination angle, and a difference between the inclination angle speed and a preset inclination angle speed as inputs of a PID controller.

The preset displacement is represented by $$S_h^{ref},$$

the preset movement speed is represented by $$\dot{S}_h^{ref},$$

the preset inclination angle is represented by $$\theta_h^{ref},$$

21 and the preset inclination angle speed is represented by $$\theta_h^{ref}.$$

Exemplarily, at least one of $$S_h^{ref}, \dot{S}_h^{ref}, \theta_h^{ref}, \text{ and } \dot{\theta}_h^{ref}$$

is determined according to a structural feature of the underactuated system robot. The determination of $$\theta_h^{ref}$$

and $$\dot{\theta}_h^{ref}$$

is similar to the determination of $$S_h^{ref} \text{ and } \dot{S}_h^{ref},$$

reference may be made to the foregoing contents, and the details are not described again.

After the difference between the displacement and the preset displacement, the difference between the movement speed and the preset movement speed, the difference between the inclination angle and the preset inclination angle, and the difference between the inclination angle speed and the preset inclination angle speed are determined, the controller of the underactuated system robot uses the four differences as the inputs of the PID controller, and the corresponding inclination angle acceleration reference value can be determined through the PID controller, to implement the control of the vehicle wheel portion and/or the base portion.

Exemplarily, step 2042 may be implemented by: determining a first difference according to the displacement and the preset displacement, determining a second difference according to the movement speed and the preset movement speed, determining a third difference according to the difference between the inclination angle and a preset inclination angle, and determining a fourth difference according to the difference between the inclination angle speed and the preset inclination angle speed; and determining the second inclination angle acceleration reference value by the PID controller according to a product of a third parameter and the first difference, a sum of products of a fourth parameter and the second difference, a product of a fifth parameter and the third parameter, and a product of a sixth parameter and the fourth parameter. The third parameter and the fifth parameter are reference values of different proportional coordination coefficients, and the fourth parameter and the sixth parameter are reference values of different differential adjustment coefficients.

For example, the displacement is $S_h$, the movement speed is $\dot{S}_h$, the inclination angle is $\theta_h$, the inclination angle speed is $\dot{\theta}_h$, the preset displacement is $$S_h^{ref},$$

the preset movement speed is $$\dot{S}_h^{ref},$$

the preset inclination angle is $$\theta_h^{ref},$$

and the preset inclination angle speed is $\dot{\theta}_h^{ref}$. A second feedback control law for controlling the loaded object to be prevented from falling from the base portion may be expressed as follows:

$$\ddot{\theta}^{des} = k_{p,S_h}\left(S_h^{ref} - S_h\right) + k_{d,S_h}\left(\dot{S}_h^{ref} - \dot{S}_h\right) + k_{p,\theta_h}\left(\theta_h^{ref} - \theta_h\right) + k_{d,\theta_h}\left(\dot{\theta}_h^{ref} - \dot{\theta}_h\right)$$

$\ddot{\theta}^{des}$ is the second inclination angle acceleration reference value, $$k_{p,S_h}$$

is the third parameter, $$k_{d,S_h}$$

is the fourth parameter, $$k_{p,\theta_h}$$

is the fifth parameter, $$k_{d,\theta_h}$$

is the sixth parameter, $$k_{p,S_h}$$

and $$k_{p,\theta_h}$$

are reference values of different proportional coordination reference coefficients, and $$k_{d,S_h}$$

and $$k_{d,\theta_h}$$

are reference values of different differential adjustment coefficients.

The controller of the underactuated system robot can implement the control of the displacement and the movement speed of the loaded object on the base portion according to the second feedback control law, so that the actual displacement of the loaded object is close to $$S_h^{ref}$$

and the movement speed of the loaded object on the base portion is close to $$\dot{S}_h^{ref}.$$

In addition, the controller of the underactuated system robot can also implement the control of the inclination angle and the inclination angle speed of the base portion according to the second feedback control law, so that the inclination angle of the base portion is close to $$\theta_h^{ref}$$

and the inclination angle speed of the base portion is close to $$\dot{\theta}_h^{ref}.$$

Exemplarily, the first parameter and the second parameter may be set to constant values, and may also be adjusted according to actual needs.

Similar to the first inclination angle acceleration reference value, the controller of the underactuated system robot may further obtain the inclination angle acceleration reference values in different target directions through the corresponding control law. For example, when the target direction is the x direction, that is, when considering the plane where the pitch is located, the second inclination angle acceleration reference value of the base portion in the pitch direction may be obtained. For another example, when the target direction is the y direction, that is, when considering the plane where the roll is located, the second inclination angle acceleration reference value of the base portion in the roll direction may be obtained.

According to the foregoing content, after the inclination angle acceleration reference value of the base portion is determined according to the status information, the controller of the underactuated system robot may control the base portion and/or the vehicle wheel portion to move correspondingly according to the inclination angle acceleration reference value and the whole-body dynamics model of the underactuated system robot.

Figure 24:
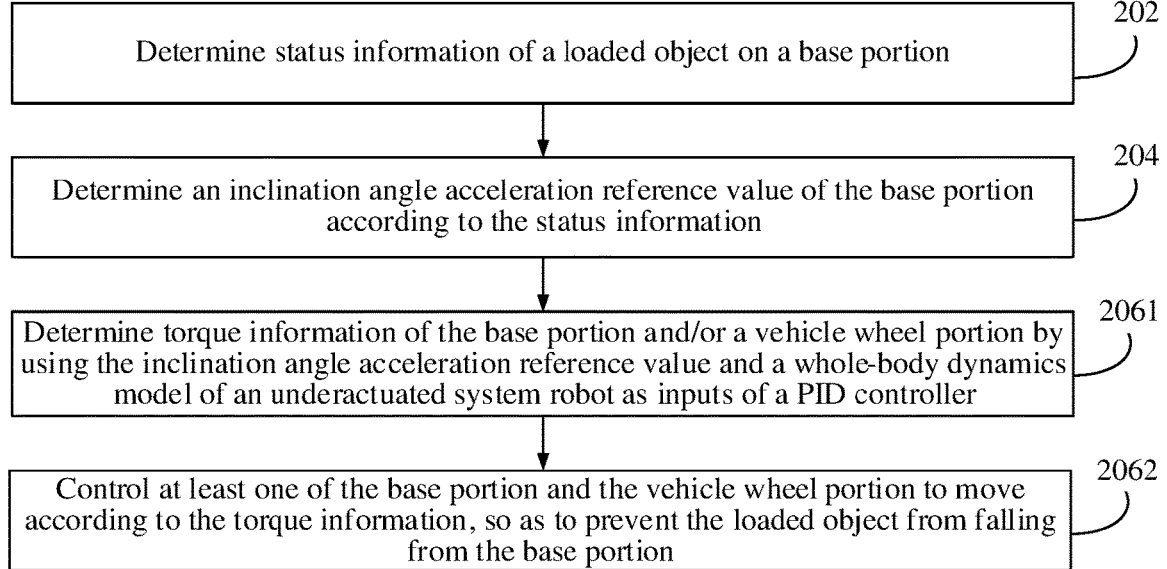
FIG. 24 is a flowchart of a movement control method for an underactuated system robot according to an exemplary embodiment of this disclosure.

Exemplarily, based on FIG. 20, FIG. 24 is a flowchart of a movement control method for an underactuated system robot according to an exemplary embodiment of this disclosure. Step 206 may be implemented as step 2061 and step 2062, which are specifically as follows.

Step 2061: Determine torque information of the base portion and/or the vehicle wheel portion by using the inclination angle acceleration reference value and the whole-body dynamics model of the underactuated system robot as inputs of a PID controller.

The input information of the whole-body dynamics model is the inclination angle acceleration reference value, and the output information is the torque information of the base portion and/or the vehicle wheel portion. It is to be understood that the whole-body dynamics model may be determined according to the Lagrange equation or Newton-Euler equation. Alternatively, the whole-body dynamics model may be determined in other manners, and the following contents are only illustrative examples and do not constitute a limitation on this application.

Exemplarily, step 2061 may be implemented by: constructing the whole-body dynamics model based on a driving torque, a ground friction, and a closed-loop force of the underactuated system robot; and substituting the inclination angle acceleration reference value into the whole-body dynamics model to determine the torque information through the PID controller.

Coordinates $$q = \left[q_{fb}^T, q_J^T\right]^T$$

of a generalized joint angle of the underactuated system robot include a pose of the base portion, a number of joint angles, and a joint angle, for example.

$$q_{fb}^T \in R^3 \times SO(3)$$

represents the pose of the base portion, $n_j$ represents the number of joint angles, and $$q_J^T = \left[q_1, q_2, \dots, q_{n_j}\right]^T$$

represents the joint angle. Similarly, the generalized joint speed may be expressed as $$\dot{q} = \left[\dot{q}_{fb}^T, \dot{q}_J^T\right]^T,$$

and the generalized joint acceleration may be expressed as $$\ddot{q} = \left[\ddot{q}_{fb}^T, \ddot{q}_J^T\right]^T.$$

According to the foregoing content, the controller of the underactuated system robot can determine the inclination angle acceleration reference value of the base portion according to the status information, and the determined inclination angle acceleration reference value may be expressed in a matrix form. Based on the foregoing content, the matrix of the inclination angle acceleration reference value obtained according to the x direction and the y direction is $$\ddot{q}_{fb}^{T}.$$

For example, the controller of the underactuated system robot can respectively determine the inclination angle acceleration reference values corresponding to the x direction and the y direction according to the control law given in the foregoing content. Then, a matrix $\ddot{q}_{jb}^{T}$ of a plurality of inclination angle acceleration reference values corresponding to the base portion is formed according to the inclination angle acceleration reference values. $\ddot{q}_{jb}^{T}$ may be substituted into the whole-body dynamics model below to generate a control reference signal of the underactuated system robot.

For example, $\tau$ represents a driving torque of the underactuated system robot, f represents a ground friction, $\lambda$ represents a closed-loop force. The whole-body dynamics model of the underactuated system robot may be expressed as follows:

$$M(q)\ddot{q} + C(q, \dot{q}) = S^{T}\tau + J_{f}^{T}f + J_{\lambda}^{T}\lambda$$

For q, $\dot{q}$, and $\ddot{q}$, reference is made to the foregoing content. $M(q) \in \mathbb{R}^{(6+n_j) \times (6+n_j)}$ is a mass matrix, $$C(q, \dot{q}) \in \mathbb{R}^{(6+n_j)}$$

is composed of gravity, a centrifugal force, and Coriolis terms, $S = [0_{n_j \times 6} \ I_{n_j \times n_j}]$ is a matrix for driving joints selected from all joints, f is a ground contact force, $$J_{f} \in \mathbb{R}^{3n_c \times (n_j+6)}$$

is cascaded contact Jacobian matrix, and $$J_{\lambda} \in \mathbb{R}^{3n_\lambda \times (n_j+6)}$$

is a connected contact Jacobian matrix. $n_C$ is a number of contact points between the wheel and the ground, and $n_\lambda = 2$ is a number of contact points between open-loop links considering a closed-loop constraint of a five-link mechanism, that is, between $P_1$ and $P_2$ in FIG. 25.

Based on the above, the movement control method for an underactuated system robot provided in the embodiment of this disclosure provides two alternative methods for determining the inclination angle acceleration reference value, to implement the control of the base portion and/or the vehicle wheel portion.

Figure 25:
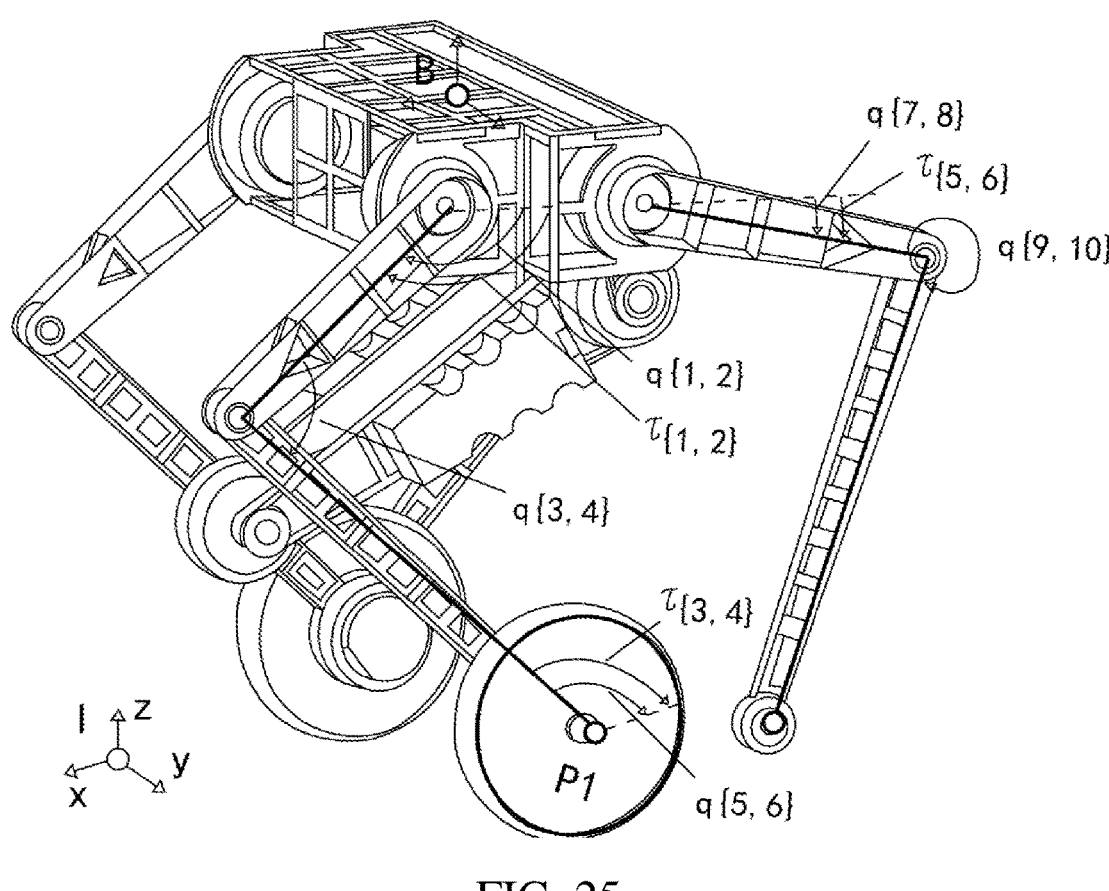
FIG. 25 is a schematic diagram of generalized coordinates of an underactuated system robot according to an exemplary embodiment of this disclosure.

FIG. 25 is a schematic diagram of generalized coordinates of an underactuated system robot according to an exemplary embodiment of this disclosure. The joint angle $q_i$ and the driving torque $\tau_i$ are marked around the joint. Double subscripts of $q_{\{\cdot,\cdot\}}$ and $\tau_{\{\cdot,\cdot\}}$ respectively represent joint indexes of left and right legs. In FIG. 25, only the connection and joints on the left leg are marked, and the right leg is symmetrical with the left leg for reference.

In addition, for the sake of clarity, two joint angles $q_{11}$ and $q_{12}$ of a tail portion and the driving torques $\tau_7$ and $\tau_8$ are omitted in FIG. 25. The controller of the underactuated system robot may determine the control reference signal of the vehicle wheel portion and/or the base portion according to the whole-body dynamics model $$M(q)\ddot{q} + C(q, q) = S^{T}\tau + J_{f}^{T}f + J_{\lambda}^{T}\lambda$$

of the underactuated system robot, such as torque information.

Exemplarily, variable values of the driving torque $\tau$, the ground friction f, and the closed-loop force $\lambda$ that enable the whole-body dynamics model to have a minimum value may be determined through the argmin function, so as to determine the control reference signal of the vehicle wheel portion and/or the base portion. The argmin function may be expressed as:

$$\underset{(\tau,f,\lambda)}{\arg\min} z = \left\| \ddot{q}^{des} - \ddot{q} \right\|_{W_q}^{2} + \left\| \tau^{des} - \tau \right\|_{W_\tau}^{2} + \|f\|_{W_f}^{2} + \|\lambda\|_{W_\lambda}^{2}.$$

In the process of determining the variable values of the driving torque $\tau$, the ground friction f, and the closed-loop force $\lambda$, it is necessary to impose a conditional constraint on the underactuated system robot.

Exemplarily, the whole-body dynamics model is constrained by a dynamics model constraint condition, the dynamics model constraint condition including the inclination angle acceleration reference value. The dynamics model constraint condition is expressed as $$M(q)\ddot{q} + C(q, q) = S^{T}\tau + J_{f}^{T}f + J_{\lambda}^{T}\lambda.$$

For the related description of the constraint condition, reference may be made to the foregoing contents, and the details are not described again.

In addition to the constraint of the dynamics model constraint condition, the underactuated system robot is further subject to at least one of the following constraints: a closed-loop link constraint; a constraint that no wheel slips or leaves the ground; and a friction constraint.

The closed-loop link constraint may be expressed as $$J_{\lambda}\ddot{q} + \dot{J}_{\lambda}\dot{q} = 0. \ J_{\lambda}^{T} = \left[ J_{P_1,l}^{T} \ -J_{P_2,l}^{T} \ J_{P_1,r}^{T} \ -J_{p_2,r}^{T} \right]^{T}, \text{ and } J_{P_1} \text{ and } J_{P_2}$$

are respectively Jacobian matrices of dots $P_1$ and $P_2$. Assuming that the wheel is purely rolling and contacts the ground, and no slip and slide occurs in radial and axial directions of the wheel, the constraint that no wheel slips or leaves the ground may be expressed as $$_B J_w^{(1,3)} \dot{q} + J_w^{(1,3)} \dot{q} = 0. \ _B J_w^{(1,3)}$$

is the Jacobian matrix of the contract point between the wheel and the ground relative to the base portion. In a local coordinate system $f_i$ of each contact force, a friction coefficient $\mu$ is given, the friction constraint may be formulated as $|f_{i,x}| \leq \mu f_{i,z}$ and $|f_{i,y}| \leq \mu f_{i,z}$, and a unilateral constraint may be expressed as $f_{i,z} > 0$.

Step 2062: Control at least one of the base portion or the vehicle wheel portion to move according to torque information, so as to prevent the loaded object from falling from the base portion.

For the loaded object being prevented from falling from the base portion, and the control of the base portion and/or the vehicle wheel portion, reference may be made to the foregoing contents, and details are not described again. After the torque information of the base portion and/or the vehicle wheel portion is determined, the controller of the underactuated system robot transmits information (the information may be torque information) for implementing movement control to the driving motor of the underactuated system robot, and the driving motor provides different driving forces according to the corresponding torque information to control the movement of the base portion and/or the vehicle wheel portion.

For example, step 2062 is similar to step 104, which may be used as reference, and details are not described again.

Based on the above, in the movement control method for an underactuated system robot provided in the embodiment of this disclosure, the inclination angle acceleration reference value of the base portion is determined according to the status information, and the controller of the underactuated system robot inputs the inclination angle acceleration reference value into the whole-body dynamics model to obtain the control reference signal of the base portion and/or the vehicle wheel portion, thereby implementing the control of the base portion and/or the vehicle wheel portion.

Exemplarily, the embodiment of this disclosure provides two alternative methods for determining the inclination angle acceleration reference value. Exemplarily, the embodiment of this disclosure provides an implementation of the whole-body dynamics model. It is to be understood that the foregoing contents are all illustrative examples, and any formula modification or increase or decrease of common variables according to the foregoing contents are included in the protection scope of this disclosure.

Figure 26:
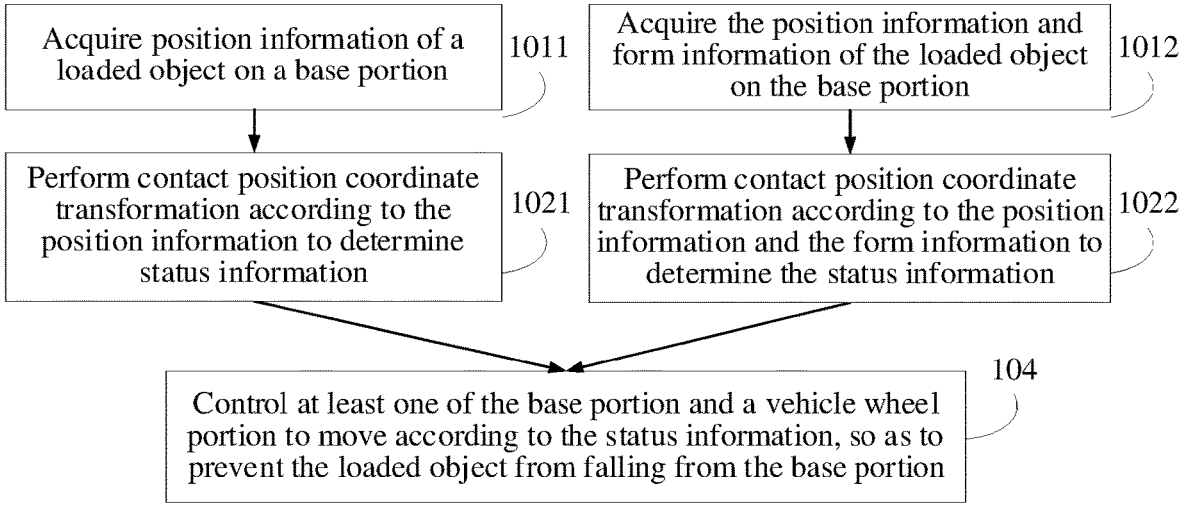
FIG. 26 is a flowchart of a movement control method for an underactuated system robot according to an exemplary embodiment of this disclosure.

According to the foregoing content, the embodiment of this disclosure further provides a method for determining the status information of the loaded object on the base portion. Based on FIG. 15, FIG. 26 is a flowchart of a movement control method for an underactuated system robot according to an exemplary embodiment of this disclosure.

Exemplarily, contact position coordinate transformation may be performed on the acquired information by acquiring position information of the loaded object on the base portion, or the position information and stress information, to determine the corresponding status information. Based on this, step 102 may be implemented as one of the following two sets of steps, which are specifically as follows.

(1) First Way to Determine the Status Information.

Step 1011: Acquire position information of a loaded object on a base portion.

The position information of the loaded object on the base portion may be acquired in a plurality of ways.

For example, the position information is sensed by a tactile sensor or a pressure sensor laid on the base portion. For another example, the position information is acquired through an action capture system. For another example, an image or a video on the base portion is acquired through a camera, and the position information is determined according to an image or video frame analysis technology.

Exemplarily, step 1011 may be implemented by at least one of: acquiring the position information through a tactile sensor laid on the base portion; acquiring the position information through a pressure sensor laid on the base portion; acquiring the position information through an action capture system; and acquiring the position information of the loaded object on the base portion through a camera.

When the position information is acquired by the tactile sensor, the tactile sensor may be composed of an m*n pressure sensor array. Exemplarily, a pressure sensor array is arranged on an upper surface of the base portion. The acquiring the position information through a tactile sensor laid on the base portion may be implemented by: determining the position information through a contact point of the loaded object on the pressure sensor array.

Exemplarily, the tactile sensor includes a pressure sensor array arranged in an m×n matrix, a length and a width of the m×n matrix matching the upper surface of the base portion, and m and n being positive integers. For example, if dimensions of the upper surface of the base portion are 40 cm*20 cm, one tactile sensor pressure acquisition point may be placed at a distance of 1 cm, and a pressure dot matrix on the upper surface of the base portion forms a corresponding 40*20 dot matrix. It is to be understood that in practical application, with the change of the dimension of the upper surface of the base portion, a difference among physical characteristics of the loaded object, a difference between an initial speed and a pressure detection range in the application scene, the delay of the bottom control of the motor, and the like, the spacing of a pressure dot matrix of the tactile sensor can be adaptively changed, and values of m and n may also be adaptively adjusted. The foregoing are only illustrative examples, and the values of m and n involved in this disclosure are not specifically limited.

Exemplarily, a photographing area of the camera covers the upper surface of the base portion when the position information is acquired through the camera. The acquiring the position information of the loaded object on the base portion through a camera may be implemented by: determining the position information according to image information acquired by the camera.

Exemplarily, the position information can be identified by position coordinates of the loaded object on the base portion.

Step 1021: Perform contact position coordinate transformation according to the position information to determine the status information.

The contact position coordinate transformation is a process of converting the position information of the loaded object on the base portion into status information. The position information is acquired by the tactile sensor by way of example. A correspondence between a force signal changing unit and a position of the pressure sensor array on the upper surface of the base portion may be described through the contact position coordinate transformation. The relationship between the position of the upper surface of the base portion and the center of mass of the underactuated system robot is known, and the contact point of the upper surface of the base portion and the loaded object may be obtained through coordinate conversion, which is corresponding to a position relationship between the loaded object and the center of mass being obtained.

The position information is acquired by the tactile sensor by way of example. When an external force of the loaded object is applied to the corresponding pressure unit, the pressure value changes. Each unit can output a corresponding pressure value, but the pressure value of the unit that is not pressed is 0 or a very small noise value, and therefore it is necessary to filter out these small noises. The process may be regarded as a signal conditioning process.

According to the different ways that the tactile sensor, the pressure sensor, the action capture system, or the camera acquires position information, the signal conditioning process is also different. Exemplarily, the signal conditioning includes but is not limited to using at least one of the following manners: averaging, calculation of force distribution, and threshold filtering.

The averaging means that the pressure values within a certain range (such as 4*4 dot matrix or several dots in a circular region) are averaged, and the contact point between the loaded object and the underactuated system robot is considered to contact the center of several dots. The calculation of force distribution means that the pressure value within a certain range is expressed in the form of distribution, and integration processing may be performed on the force value to obtain the magnitude and position distribution of the force, to determine the state of the loaded object. The threshold filtering means that because there is a certain probability that the pressure sensor is not detected, some noise may be detected without force, and a threshold is set accordingly. When the detected pressure value is below the threshold, it is considered that the sensor is not triggered.

It is to be understood that the foregoing is an example of the signal conditioning process and does not constitute a limitation on the signal conditioning involved in this disclosure.

Exemplarily, the position information may further be used for subsequent control. The rolling direction and speed of the loaded object on the base portion may be obtained by using a difference between positions of points on the base portion that contact the loaded object at two adjacent moments.

The two adjacent moments may be regarded as two adjacent acquisition time points in a sampling period. The position information is acquired by the tactile sensor by way of example. It is assumed that the sampling period of the tactile sensor is 1,000 or 500 times a second, and two adjacent moments are two adjacent acquisition time points. (2) Second Way to Determine the Status Information.

Step 1012: Acquire position information and form information of a loaded object on a base portion.

For example, the form information includes at least one piece of stress information, shape information, structure information, and physical information.

The stress information refers to a stress value of the loaded object at a certain point on the base portion, and the stress information may be acquired in a plurality of manners. For example, the position information is sensed by a tactile sensor or a pressure sensor laid on the base portion. For another example, the position information is acquired through an action capture system.

For example, related information such as the position, a displacement direction, a speed, and an acceleration of the loaded object on the base portion may be determined according to the stress information.

The shape information is an external shape of the loaded object. For example, the shape information of the loaded object is a regular sphere or an irregular polyhedron. The structure information means that the composition structure of the loaded object includes but is not limited to components of the loaded object, a relative position relationship between components, and shapes and positions of components. The physical information is parameter information related to the physical characteristics of the loaded object, such as the mass and moment of inertia of the loaded object.

The acquisition manners of shape information, structure information, and physical information are similar. For example, the information may be sensed by a tactile sensor or a pressure sensor, or may be acquired by a camera, or may be manually inputted into the controller of the underactuated system robot by an operator.

Step 1022: Perform contact position coordinate transformation according to the position information and the stress information to determine the status information.

For the contact position coordinate transformation, reference may be made to the foregoing content.

For example, step 1022 is similar to step 1021, which may be used as reference, and details are not described again.

In an exemplary implementation scenario, the controller of the underactuated system robot issues an instruction to at least one auxiliary component of the tactile sensor, the pressure sensor, the action capture system, and the camera to acquire the position information or the position information and the stress information of the loaded object on the base portion. Subsequently, at least one auxiliary component reports the position information or the position information and the stress information of the loaded object on the base portion to the controller, and the controller determines the status information according to the position information or the position information and the stress information. Alternatively, the position information or the position information and the stress information may be processed by at least one auxiliary component to obtain status information, and then the status information is reported to the controller.

Based on the above, the movement control method for an underactuated system robot provided in the embodiment of this disclosure provides an optional determination manner of the status information.

Figure 27:
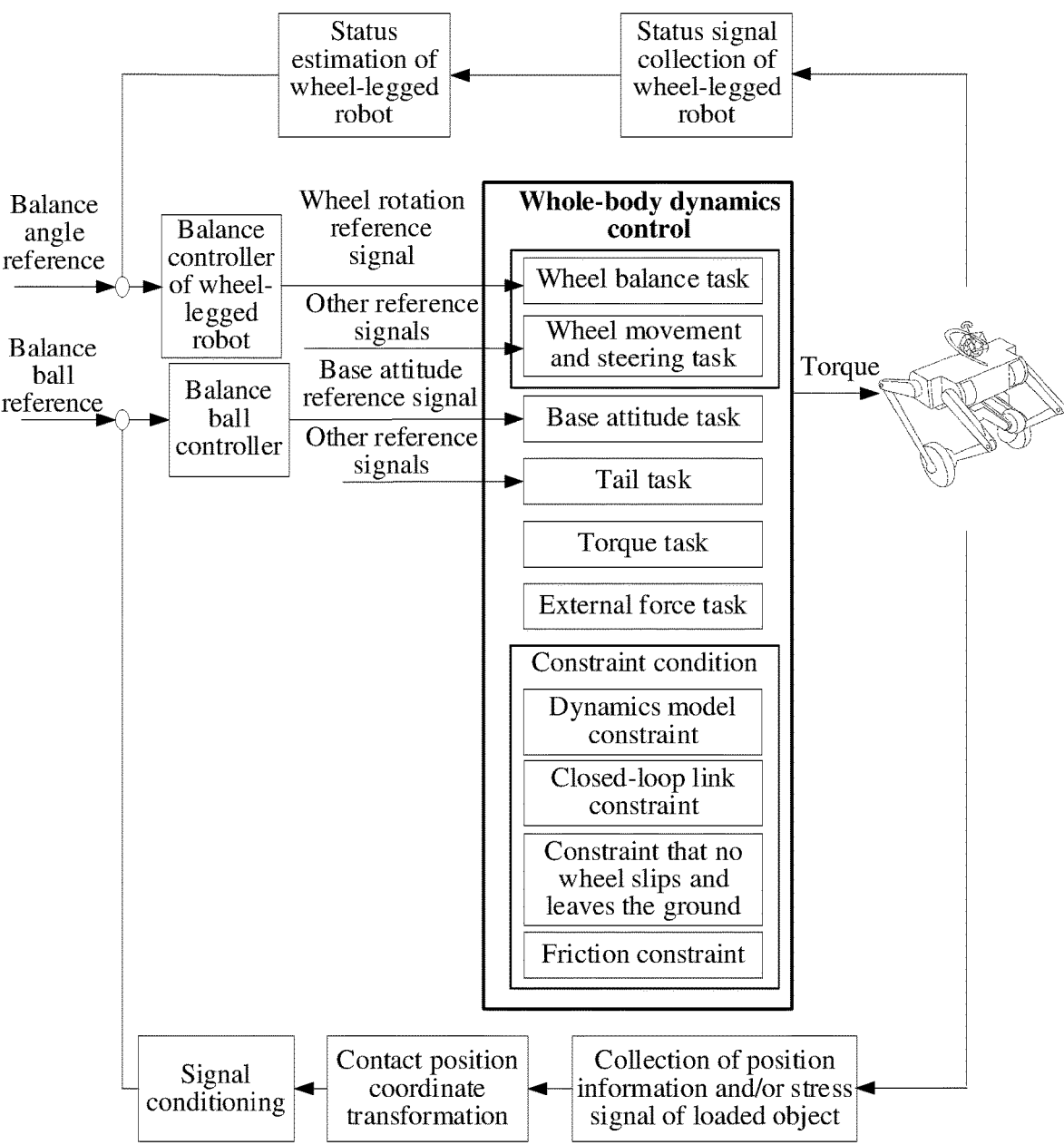
FIG. 27 is an overall control frame diagram of an underactuated system robot according to an exemplary embodiment of this disclosure.

According to the foregoing content, the underactuated system robot is a wheel-legged robot and the loaded object is a sphere by way of example. FIG. 27 is an overall control frame diagram of an underactuated system robot according to an exemplary embodiment of this disclosure. The wheel-legged robot includes a balance controller and a balance ball controller. The balance controller is configured to complete a cycle of balance angle reference to implement body balance of the wheel-legged robot. The balance ball controller is configured to implement a cycle of the balance ball reference to achieve the goal of keeping the loaded object from falling from the base portion.

Exemplarily, the wheel-legged robot estimates the state through state signal collection, and determines a wheel rotation reference signal and other reference signals through the balance controller after the estimation is completed, which are used for controlling the movement of the vehicle wheel portion. The wheel rotation reference signal is used for completing a wheel balance task, and other reference signals are used for completing a wheel movement and steering task.

Exemplarily, the wheel-legged robot performs contact position coordinate transformation through position information collection and/or stress information collection of the loaded object, and then determines a base attitude signal and other reference signals by using the balance ball controller through signal conditioning, which are used for controlling the movement of the base portion. The base attitude reference signal is used for completing a base attitude task, and other reference signals are used for completing a tail task. For example, the base attitude reference signal may be determined according to the inclination angle acceleration reference value of the base portion mentioned in the foregoing content, and is used for determining at least one of an inclination direction, an inclination angle, and an inclination angle speed of the base portion.

According to the foregoing content, the overall movement of the wheel-legged robot is controlled by whole-body dynamics control, and the movement of the vehicle wheel portion and the base portion needs to satisfy the needs of the whole-body dynamics control.

In the whole-body dynamics control, different control tasks are added according to the whole-body dynamics model, and considering physical constraints of the body, mapping between angular acceleration information of a joint space and a task space to each joint torque is established. By transmitting the joint torque to the corresponding driving motor of the wheel-legged robot, joint force control of the robot is realized, and then a form, an attitude, and a position of the robot in space are changed.

For example, the control task includes a wheel balancing task, a wheel moving and steering task, a base attitude task, a tail task, a torque task, and an external force task. The wheel balancing task is to keep the attitude of an upper body of the robot balanced, and the wheel moving and steering task is a task that satisfies movement forward and backward of the robot and steering in a yaw direction. The base attitude task can realize the rotation of the base in pitch, roll, and yaw directions and the translation in x, y, and z directions. The tail task may be to place the tail portion to a specified position according to a given joint angle value corresponding to the tail portion. The torque task is generally to introduce the integral of a sum of squares of the torque of each joint motor with time into a cost function to ensure that the value of each joint torque falls within a limited value range in the process of optimal solution. The external force task includes external forces in three directions corresponding to the contact points between two wheels and the ground respectively. The integral of a sum of squares of the external forces with time is introduced into a cost function, so as to ensure that values of the external forces all fall within a limited value range in the process of optimal solution.

Exemplarily, the whole-body dynamics model is subject to a plurality of constraint conditions. The constraint conditions include a dynamics model constraint condition, a closed-loop link constraint, a constraint that no wheel slips or leaves the ground, and a friction constraint.

Based on the above, the movement control method for an underactuated system robot provided in the embodiment of this disclosure provides an optional determination manner of the status information. In addition, the embodiment of this disclosure further gives an overall control framework using the wheel-legged robot as an example.

For example, an embodiment of this disclosure further provides an underactuated system robot.

For example, the underactuated system robot includes a vehicle wheel portion and a base portion coupled to the vehicle wheel portion, the base portion being configured to bear a loaded object; a controller being arranged in that underactuated system robot, the controller being configured to control the underactuated system robot to: control at least one of the base portion or the vehicle wheel portion to move according to status information of the loaded object on the base portion, so as to prevent the loaded object from falling from the base portion. The controller may be arranged according to the actual needs, which is not limited in this disclosure. All underactuated system robots that can achieve the goal of keeping the loaded object from falling from the base portion through the movement control of the controller fall within the protection scope of this disclosure. The movement control of the underactuated system robot has been described in detail in the foregoing contents, which may be used as a reference, and details are not described again.

Exemplarily, a pressure sensor array is arranged on an upper surface of the base portion. The pressure sensor array is configured to acquire position information of the loaded object on the base portion. The density of the pressure sensor array may be limited according to the actual needs. For details, reference is made to the foregoing part, and details are not described again. For example, the tactile sensor includes a pressure sensor array arranged in an m×n matrix, a length and a width of the m×n matrix matching the upper surface of the base portion, and m and n being positive integers.

Exemplarily, the underactuated system robot further includes a camera. The camera is configured to acquire the position information of the loaded object on the base portion.

Exemplarily, the camera is arranged on the base portion, and a photographing area of the camera covers the upper surface of the base portion.

Apparatus embodiments of this disclosure are described below. For details that are not described in detail in the apparatus embodiments, reference may be made to the corresponding records in the foregoing method embodiments, and details are not described herein again.

Figures 28, 29:
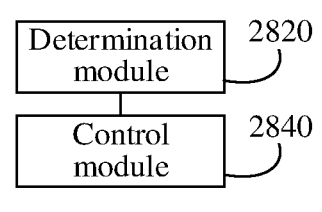
FIG. 28 is a schematic diagram of a movement control apparatus of an underactuated system robot according to an exemplary embodiment of this disclosure.
FIG. 29 is a block diagram of an electronic device according to an exemplary embodiment of this disclosure.

FIG. 28 is a schematic diagram of a movement control apparatus of an underactuated system robot according to an exemplary embodiment of this disclosure. The apparatus includes: a determination module 2820, configured to determine status information of a loaded object on a base portion; and a control module 2840, configured to control at least one of the base portion or a vehicle wheel portion to move according to the status information, so as to prevent the loaded object from falling from the base portion.

Exemplarily, the vehicle wheel portion includes a leg portion and a wheel portion. The control module 2840 is configured to control the wheel portion to move and the base portion to move inclinedly according to the status information, so as to maintain body balance of the underactuated system robot and prevent the loaded object from falling from the base portion, the inclined movement of the base portion and the movement of the wheel portion interacting with each other through stretching/retraction of the leg portion.

Exemplarily, the control module 2840 is configured to control the vehicle wheel portion to move and the base portion to move inclinedly according to the status information when the loaded object and/or the underactuated system robot is subject to external interference, so as to maintain body balance of the underactuated system robot and prevent the loaded object from falling from the base portion.

Exemplarily, the external interference includes at least one of the following: a center of the loaded object is subject to external interference; a part of the loaded object other than the center is subject to external interference; a center of mass of the loaded object is subject to external interference; a circumferential side of the center of mass of the loaded object is subject to external interference; the base portion is subject to external interference; and the vehicle wheel portion is subject to external interference.

Exemplarily, the control module 2840 is configured to: control the wheel portion to move forward in a first direction according to the status information when the loaded object moves on the base portion in the first direction; or control one side of the base portion relatively close to the first direction to lift and the other side of the base portion relatively away from the first direction to fall according to the status information when the loaded object moves in the first direction; or control the wheel portion to move forward in the first direction and controlling the one side of the base portion relatively close to the first direction to lift and the other side of the base portion relatively away from the first direction to fall according to the status information when the loaded object moves in the first direction.

Exemplarily, the control module 2840 is configured to: determine an inclination angle acceleration reference value of the base portion according to the status information; and control the at least one of the base portion or the vehicle wheel portion to move according to the inclination angle acceleration reference value and a whole-body dynamics model of the underactuated system robot.

Exemplarily, the status information includes: a displacement of a contact point of the loaded object on the base portion in a target direction relative to a center of mass of the underactuated system robot on the base portion, and a movement speed of the contact point on the base portion in the target direction. The control module 2840 is configured to determine a first inclination angle acceleration reference value of the base portion by using a difference between the displacement and a preset displacement and a difference between the movement speed and a preset movement speed as inputs of a PID controller.

Exemplarily, the status information includes: a displacement of a contact point of the loaded object on the base portion in a target direction relative to the center of mass of the underactuated system robot on the base portion, a movement speed of the contact point on the base portion in the target direction, an inclination angle of the base portion, and an inclination angle speed of the base portion. The control module 2840 is configured to determine a second inclination angle acceleration reference value of the base portion by using a difference between the displacement and a preset displacement, a difference between the movement speed and a preset movement speed, a difference between the inclination angle and a preset inclination angle, and a difference between the inclination angle speed and a preset inclination angle speed as inputs of a PID controller.

Exemplarily, at least one of the preset displacement, the preset movement speed, the preset inclination angle, and the preset inclination angle speed is determined according to structural features of the underactuated system robot.

Exemplarily, the control module 2840 is configured to: determine torque information of the base portion and/or the vehicle wheel portion by using the inclination angle acceleration reference value and the whole-body dynamics model of the underactuated system robot as inputs of a PID controller; and control the at least one of the base portion or the vehicle wheel portion to move according to the torque information.

Exemplarily, the control module 2840 is configured to: construct the whole-body dynamics model based on a driving torque, a ground friction, and a closed-loop force of the underactuated system robot; and substitute the inclination angle acceleration reference value into the whole-body dynamics model to determine the torque information through the PID controller. Exemplarily, the whole-body dynamics model is constrained by a dynamics model constraint condition, the dynamics model constraint condition including the inclination angle acceleration reference value.

Exemplarily, the determination module 2820 is configured to acquire position information of a loaded object on a base portion; and perform contact position coordinate transformation according to the position information to determine the status information.

Exemplarily, the determination module 2820 is configured to: acquire the position information through a tactile sensor laid on the base portion; or acquire the position information through a pressure sensor laid on the base portion; or acquire the position information through an action capture system; or acquire the position information of the loaded object on the base portion through a camera.

Exemplarily, a pressure sensor array is arranged on an upper surface of the base portion. The determination module 2820 is configured to determine the position information through a contact point of the loaded object on the pressure sensor array. Exemplarily, the tactile sensor includes a pressure sensor array arranged in an m×n matrix, a length and a width of the m×n matrix matching the upper surface of the base portion, and m and n being positive integers.

Exemplarily, a photographing area of the camera covers the upper surface of the base portion. The determination module 2820 is configured to determine the position information according to image information acquired by the camera.

Exemplarily, the determination module 2820 is configured to: acquire the position information and form information of the loaded object on the base portion, the status information including at least one piece of stress information, shape information, structure information, and physical information; and perform contact position coordinate transformation according to the position information and the form information to determine the status information.

For the apparatus provided in the foregoing embodiments, only division of the functional modules is described by using examples. In practical application, the functions are completed by different functional modules as required. That is to say, an internal structure of the device is divided into different functional modules to complete all or a part of the functions described above. In addition, the apparatus provided in the foregoing embodiments and the method embodiments in the foregoing content fall within a same conception. For details of a specific implementation process, refer to the method embodiments. Details are not described herein again.

The term module (and other similar terms such as unit, submodule, etc.) in this disclosure may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module.

FIG. 29 is a structural block diagram of an electronic device 2900 according to an exemplary embodiment of this disclosure.

The electronic device 2900 may be a portable mobile terminal, such as an electronic device, a smartphone, a tablet computer, a Moving Picture Experts Group Audio Layer III (MP3) player, a Moving Picture Experts Group Audio Layer IV (MP4) player, a notebook computer, or a desktop computer that is configured to implement the control of the underactuated system robot. The electronic device 2900 may further be referred to as another name such as user equipment, a portable terminal, a laptop terminal, a desktop terminal, or the like. In the embodiment of this disclosure, the electronic device 2900 may be implemented as a control device part in a robot.

The electronic device 2900 generally includes a processor 2901 and a memory 2902.

The processor 2901 may include one or more processing cores, such as a 4-core processor, an 8-core processor, and the like. The processor 2901 may be implemented in at least one hardware form of a digital signal processor (DSP), a field-programmable gate array (FPGA), and a programmable logic array (PLA). The processor 2901 may also include a main processor and a coprocessor. The main processor is a processor configured to process data in an awake state, and is also referred to as a central processing unit (CPU). The coprocessor is a low power consumption processor configured to process the data in a standby state. In some embodiments, the processor 2901 may be integrated with a graphics processing unit (GPU). The GPU is configured to render and draw content that needs to be displayed on a display screen. In some embodiments, the processor 2901 may further include an artificial intelligence (AI) processor. The AI processor is configured to process computing operations related to machine learning.

The memory 2902 may include one or more computer-readable storage media. The computer-readable storage medium may be non-transient. The memory 2902 may further include a high-speed random access memory and a nonvolatile memory, for example, one or more disk storage devices or flash storage devices. In some embodiments, the non-transient computer-readable storage medium in the memory 2902 is configured to store at least one instruction, the at least one instruction being configured to be executed by the processor 2901 to implement the movement control method for an underactuated system robot provided in the method embodiments of this disclosure.

In some embodiments, the electronic device 2900 may further Exemplarily include a peripheral device interface 2903 and at least one peripheral device. The processor 2901, the memory 2902, and the peripheral device interface 2903 may be connected through a bus or a signal line. Each peripheral device may be connected to the peripheral device interface 2903 through a bus, a signal line, or a circuit board. Specifically, the peripheral device includes: at least one of a radio frequency (RF) circuit 2904, a display screen 2905, a camera assembly 2906, an audio circuit 2907, and a power supply 2908.

The peripheral device interface 2903 may be configured to connect the at least one peripheral device related to input/output (I/O) to the processor 2901 and the memory 2902. In some embodiments, the processor 2901, the memory 2902, and the peripheral device interface 2903 are integrated on the same chip or circuit board. In some other embodiments, any or both of the processor 2901, the memory 2902, and the peripheral device interface 2903 may be implemented on an independent chip or circuit board, which is not limited in this embodiment.

The RF circuit 2904 is configured to receive and transmit an RF signal, which is also referred to as an electromagnetic signal. The RF circuit 2904 communicates with a communication network and other communication devices through the electromagnetic signal. The RF circuit 2904 converts an electric signal into an electromagnetic signal for transmission, or converts a received electromagnetic signal into an electric signal. Exemplarily, the RF circuit 2904 includes: an antenna system, an RF transceiver, one or more amplifiers, a tuner, an oscillator, a digital signal processor, a codec chip set, a subscriber identity module card, and the like. The RF circuit 2904 may communicate with other terminals by using at least one wireless communication protocol. The wireless communication protocol includes but is not limited to: the World Wide Web, a metropolitan area network, Intranet, various generations of mobile communication networks (2G, 3G, 4G, and 5G), a wireless local area network, and/or a wireless fidelity (Wi-Fi) network. In some embodiments, the RF circuit 2904 may further include a near field communication (NFC)-related circuit, which is not limited in this disclosure.

The display screen 2905 is configured to display a user interface (UI). The UI may include a graph, texts, an icon, a video, and any combination thereof. When the display screen 2905 is a touch display screen, the display screen 2905 further has the capability of collecting a touch signal on or above a surface of the display screen 2905. The touch signal may be inputted to the processor 2901 as a control signal for processing. In this case, the display screen 2905 may be further configured to provide a virtual button and/or a virtual keyboard, which are/is also referred to as a soft button and/or a soft keyboard. In some embodiments, one display screen 2905 may be arranged on a front panel of the electronic device 2900. In some other embodiments, at least two display screens 2905 may be respectively arranged on different surfaces of the electronic device 2900 or may be folded. In some other embodiments, the display screen 2905 may be a flexible display screen arranged on a curved surface or a folding surface of the electronic device 2900. The display screen 2905 may be even arranged as a non-rectangular irregular figure, that is, a special-shaped screen. The display screen 2905 may be manufactured by using a liquid crystal display (LCD), an organic light-emitting diode (OLED), or the like.

The camera assembly 2906 is configured to collect an image or a video. Exemplarily, the camera assembly 2906 includes a front camera and a rear camera. Generally, the front camera is arranged on the front panel of the terminal, and the rear camera is arranged on the back of the terminal. In some embodiments, at least two rear cameras are arranged, which are respectively any of a main camera, a depth-of-field camera, a wide-angle camera, and a telephoto camera, to achieve background blurring through fusion of the main camera and the depth-of-field camera, panoramic shooting and virtual reality (VR) shooting through fusion of the main camera and the wide-angle camera, or other fusion shooting functions. In some embodiments, the camera assembly 2906 may further include a flashlight. The flashlight may be a single-color-temperature flashlight or a dual-color-temperature flashlight. The dual-color-temperature flashlight is a combination of a warm flashlight and a cold flashlight, which may be used for light compensation at different color temperatures.

The audio circuit 2907 may include a microphone and a speaker. The microphone is configured to collect sound waves of a user and an environment, and convert the sound waves into electrical signals and input the electrical signals to the processor 2901 for processing, or input the electrical signals to the RF circuit 2904 to implement voice communication. For the purpose of stereo collection or noise reduction, a plurality of microphones may be respectively arranged at different parts of the electronic device 2900. The microphone may be further an array microphone or an omnidirectional acquisition microphone. The speaker is configured to convert the electrical signal from the processor 2901 or the RF circuit 2904 into sound waves. The speaker may be a conventional film speaker, or may be a piezoelectric ceramic speaker. When the speaker is the piezoelectric ceramic speaker, the speaker not only can convert an electric signal into the sound wave audible to a human being, but also can convert the electric signal into the sound wave inaudible to a human being, for ranging and other purposes. In some embodiments, the audio circuit 2907 may further include a headphone jack.

The power supply 2908 is configured to supply power to assemblies in the electronic device 2900. The power supply 2908 may be an alternating current battery, a direct current battery, a disposable battery, or a rechargeable battery. When the power supply 2908 includes a rechargeable battery, the rechargeable battery may be a wired rechargeable battery or a wireless rechargeable battery. The wired rechargeable battery is a battery charged through a wired circuit, and the wireless rechargeable battery is a battery charged through a wireless coil. The rechargeable battery may be further configured to support a fast charging technology.

In some embodiments, the electronic device 2900 further includes one or more sensors 2909. The one or more sensors 2909 include but are not limited to: an acceleration sensor 2910, a gyroscope sensor 2911, a pressure sensor 2912, an optical sensor 2913, and a proximity sensor 2914.

The acceleration sensor 2910 may detect a magnitude of acceleration on three coordinate axes of a coordinate system established with the electronic device 2900. For example, the acceleration sensor 2910 may be configured to detect components of acceleration of gravity on the three coordinate axes. The processor 2901 may control, according to a gravity acceleration signal collected by the acceleration sensor 2910, the display screen 2905 to display the UI in a landscape view or a portrait view. The acceleration sensor 2910 may be further configured to collect movement data of a game or a user.

The gyroscope sensor 2911 may detect a body direction and a rotation angle of the electronic device 2900. The gyroscope sensor 2911 may cooperate with the acceleration sensor 2910 to collect a 3D action performed by a user on the electronic device 2900. The processor 2901 may implement the following functions according to the data collected by the gyroscope sensor 2911: movement sensing (for example, changing the UI based on a tilt operation of the user), image stabilization during shooting, game control, and inertial navigation.

The pressure sensor 2912 may be arranged at a side frame of the electronic device 2900 and/or a lower layer of the display screen 2905. When the pressure sensor 2912 is arranged at the side frame of the electronic device 2900, a grip signal of the user on the electronic device 2900 may be detected, and the processor 2901 may perform left-right hand recognition or a shortcut operation according to the grip signal collected by the pressure sensor 2912. When the pressure sensor 2912 is arranged at the lower layer of the display screen 2905, the processor 2901 controls an operable control on the UI interface according to a pressure operation performed by the user on the display screen 2905. The operable control includes at least one of a button control, a scroll-bar control, an icon control, and a menu control.

The optical sensor 2913 is configured to collect ambient light intensity. In an embodiment, the processor 2901 may control display brightness of the display screen 2905 according to the ambient light intensity collected by the optical sensor 2913. Specifically, when the ambient light intensity is relatively high, the display brightness of the display screen 2905 is increased. When the ambient light intensity is relatively low, the display brightness of the display screen 2905 is reduced. In another embodiment, the processor 2901 may further dynamically adjust a shooting parameter of the camera assembly 2906 according to the ambient light intensity collected by the optical sensor 2913.

The proximity sensor 2914, also referred to as a distance sensor, is usually arranged on the front panel of the electronic device 2900. The proximity sensor 2914 is configured to acquire a distance between the user and a front side of the electronic device 2900. In an embodiment, when the proximity sensor 2914 detects that the distance between the user and the front side of the electronic device 2900 gradually becomes smaller, the processor 2901 controls the display screen 2905 to be switched from a screen-on state to a screen-off state. When the proximity sensor 2914 detects that the distance between the user and the front side of the electronic device 2900 gradually becomes larger, the processor 2901 controls the display screen 2905 to be switched from the screen-off state to the screen-on state.

A person skilled in the art may understand that the structure shown in FIG. 29 does not constitute a limitation on the electronic device 2900, and may include more or fewer assemblies than that shown in the drawing, or combine some assemblies, or adopt different assembly arrangements.

Figure 30:
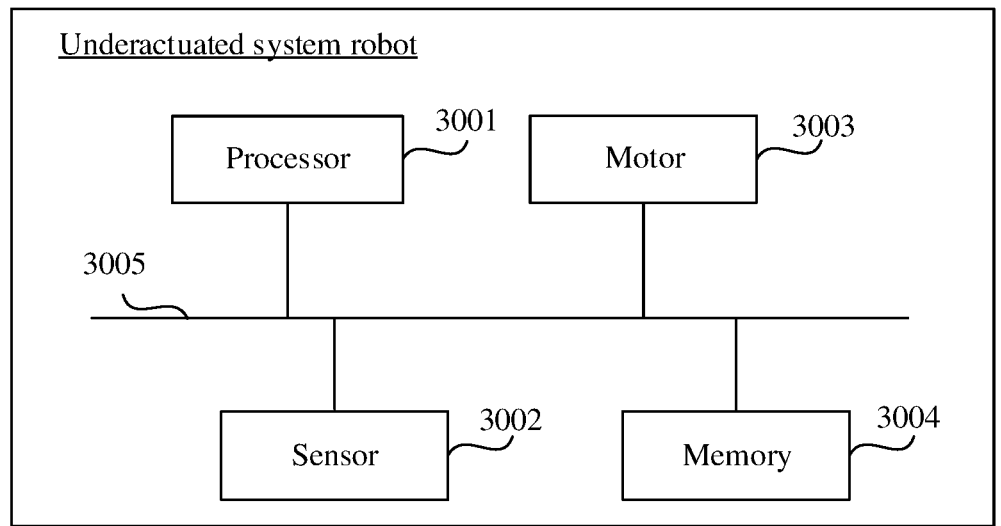
FIG. 30 is a structural block diagram of an underactuated system robot according to an exemplary embodiment of this disclosure.

FIG. 30 is a schematic structural block diagram of an underactuated system robot according to an embodiment of this disclosure. As shown in FIG. 30, the underactuated system robot in this embodiment may include: one or more processors 3001; and one or more sensors 3002, one or more motors 3003, and a memory 3004. The processor 3001, the sensor 3002, the motor 3003, and the memory 3004 are connected through a bus 3005. The memory 3004 is configured to store a computer program. The computer program includes a program instruction. The processor 3001 is configured to execute the program instruction stored in the memory 3004.

The processor 3001 may be a central processing unit (CPU). The processor 3001 may further include a hardware chip. The foregoing hardware chip may be an application-specific integrated circuit (ASIC), a programmable logic device (PLD), or the like. The PLD may be a field-programmable gate array (FPGA), a generic array logic (GAL), and the like. The processor 3001 may also be a combination of the foregoing structures. In some embodiments, the processor 3001 may be implemented as an internal controller of the underactuated system robot involved in the foregoing content.

The sensor 3002 is configured to acquire status data related to the movement control of the underactuated system robot, such as position information and/or stress information involved in the foregoing contents.

The motor 3003 is configured to control the movement of the underactuated system robot and complete the movement action. Exemplarily, the motor 3003 includes a joint motor and a wheel motor of the underactuated system robot.

The memory 3004 may include a volatile memory such as a random-access memory (RAM). The memory 3004 may also include a non-volatile memory such as a flash memory, a solid-state drive (SSD), or the like. Exemplarily, the memory 3004 may further include a combination of the foregoing types of memories.

In the embodiment of this disclosure, the memory 3004 is configured to store a computer program. The computer program includes a program instruction. The processor 3001 is configured to execute the program instruction stored in the memory 3004 to implement the movement control method for an underactuated system robot given in the foregoing content.

An embodiment of this disclosure further provides a computer device. The computer device includes a processor, the processor being configured to: determine status information of a loaded object on a base portion; and control at least one of the base portion or the vehicle wheel portion to move according to the status information, so as to prevent the loaded object from falling from the base portion.

An embodiment of this disclosure further provides a computer-readable storage medium, the storage medium storing a computer program, the computer program being executed by a processor to implement the movement control method for an underactuated system robot as described above.

An embodiment of this disclosure further provides a chip, including a programmable logic circuit and/or program instructions, the chip, when run, being configured to implement the movement control method for an underactuated system robot as described above.

An embodiment of this disclosure further provides a computer program product, including computer instructions stored in a computer-readable storage medium, a processor reading the computer instructions from the computer-readable storage medium and executing the computer instructions, to implement the movement control method for an underactuated system robot as described above.

In this disclosure, it is to be understood that the terms such as "first" and "second" are used only for the purpose of description, and not to be understood as indicating or implying the relative importance or implicitly specifying a number of indicated technical features.

An optional embodiment of this disclosure may be formed by using any combination of all the foregoing optional technical solutions, and the details are not described herein again.

The foregoing descriptions are merely optional embodiments of this disclosure, but are not intended to limit this disclosure. Any modification, equivalent replacement, or improvement made within the spirit and principle of this disclosure shall fall within the protection scope of this disclosure.

What is claimed is:

1. A movement control method, the method being performed by at least one controller of an underactuated system robot, the underactuated system robot comprising a vehicle wheel portion and a base portion placed with a loaded object and coupled to the vehicle wheel portion, the method comprising:

acquiring position information of the loaded object on the base portion;

performing contact position coordinate transformation according to the position information to determine status information of the loaded object on the base portion; and controlling at least one of the base portion or the vehicle wheel portion to move according to the status information to prevent the loaded object from falling from the base portion.

2. The method according to claim 1, wherein the vehicle wheel portion comprises a leg portion and a wheel portion, and controlling at least one of the base portion or the vehicle wheel portion to move according to the status information comprises:

controlling the wheel portion to move and the base portion to move inclinedly according to the status information, such that movement of the base portion and movement of the wheel portion interacting with each other through stretching/retraction of the leg portion to maintain body balance of the underactuated system robot and prevent the loaded object from falling from the base portion.

3. The method according to claim 2, wherein controlling the wheel portion to move and the base portion to move inclinedly according to the status information comprises:

controlling the wheel portion to move and the base portion to move inclinedly according to the status information when at least one of the loaded object or the underactuated system robot is subject to external interference.

4. The method according to claim 3, wherein controlling the wheel portion to move and the base portion to move inclinedly according to the status information when at least one of the loaded object or the underactuated system robot is subject to external interference comprises controlling the wheel portion to move and the base portion to move inclinedly according to the status information at least when:

a center of the loaded object is subject to the external interference;

a part of the loaded object other than the center is subject to the external interference;

a center of mass of the loaded object is subject to the external interference;

a circumferential side of the center of mass of the loaded object is subject to the external interference;

the base portion is subject to the external interference; or the vehicle wheel portion is subject to external interference.

5. The method according to claim 2, wherein controlling the vehicle wheel portion to move and the base portion to move inclinedly according to the status information comprises at least one of:

controlling the vehicle wheel portion to move forward in a first direction according to the status information when the loaded object moves on the base portion in the first direction; or controlling a first side of the base portion to lift and a second side of the base portion to fall according to the status information when the loaded object moves in the first direction, the first side is relatively closer to a space pointed by the first direction than the second side; or controlling the wheel portion to move forward in the first direction and controlling the first side of the base portion to lift and the second side of the base portion away from the first direction to fall according to the status information when the loaded object moves in the first direction.

6. The method according to claim 1, wherein controlling at least one of the base portion or the vehicle wheel portion to move according to the status information comprises:

determining an inclination angle acceleration reference value of the base portion according to the status information; and controlling the at least one of the base portion or the vehicle wheel portion to move according to the inclination angle acceleration reference value and a whole-body dynamics model of the underactuated system robot.

7. The method according to claim 6, wherein:

the status information comprises a displacement of a contact point of the loaded object on the base portion in a target direction relative to a center of mass of the underactuated system robot on the base portion and a movement speed of the contact point on the base portion in the target direction; and determining an inclination angle acceleration reference value of the base portion according to the status information comprises determining a first inclination angle acceleration reference value of the base portion by using a difference between the displacement and a preset displacement and a difference between the movement speed and a preset movement speed as inputs of a closed-loop proportional-integral-derivative (PID) controller.

8. The method according to claim 6, wherein the status information comprises a displacement of a contact point of the loaded object on the base portion in a target direction relative to a center of mass of the underactuated system robot on the base portion, a movement speed of the contact point on the base portion in the target direction, an inclination angle of the base portion, and an inclination angle speed of the base portion; and determining an inclination angle acceleration reference value of the base portion according to the status information comprises:

determining a second inclination angle acceleration reference value of the base portion by using a difference between the displacement and a preset displacement, a difference between the movement speed and a preset movement speed, a difference between the inclination angle and a preset inclination angle, and a difference between the inclination angle speed and a preset inclination angle speed as inputs of a closed-loop PID controller.

9. The method according to claim 8, wherein at least one of the preset displacement, the preset movement speed, the preset inclination angle, and the preset inclination angle speed is determined according to structural features of the underactuated system robot.

10. The method according to claim 6, wherein controlling the at least one of the base portion or the vehicle wheel portion to move according to the inclination angle acceleration reference value and a whole-body dynamics model of the underactuated system robot comprises:

determining torque information of at least one of the base portion or the vehicle wheel portion by using the inclination angle acceleration reference value and the whole-body dynamics model of the underactuated system robot as inputs of a closed-loop PID controller; and controlling the at least one of the base portion and the vehicle wheel portion to move according to the torque information.

11. The method according to claim 10, wherein determining torque information of at least one of the base portion or the vehicle wheel portion by using the inclination angle acceleration reference value and the whole-body dynamics model of the underactuated system robot as inputs of a PID controller comprises:

constructing the whole-body dynamics model based on a driving torque, a ground friction, and a closed-loop force of the underactuated system robot; and substituting the inclination angle acceleration reference value into the whole-body dynamics model to determine the torque information through the PID controller.

12. The method according to claim 11, wherein the whole-body dynamics model is constrained by a dynamics model constraint condition, the dynamics model constraint condition comprising the inclination angle acceleration reference value.

13. The method according to claim 1, wherein acquiring position information of the loaded object on the base portion comprises at least one of:

acquiring the position information through a tactile sensor laid on the base portion;

acquiring the position information through a pressure sensor laid on the base portion;

acquiring the position information through an action capture system; or acquiring the position information of the loaded object on the base portion through a camera.

14. The method according to claim 13, wherein acquiring the position information through a tactile sensor laid on the base portion comprises:

determining the position information through a contact point of the loaded object on a pressure sensor array arranged on an upper surface of the base portion.

15. The method according to claim 14, wherein the pressure sensor array is arranged in an m×n matrix, a length and a width of the m×n matrix matching the upper surface of the base portion, and m and n being positive integers.

16. The method according to claim 13, wherein acquiring the position information of the loaded object on the base portion through a camera comprises:

determining the position information according to image information acquired by the camera, a photographing area of the camera covering an upper surface of the base portion.

17. The method according to claim 1, wherein acquiring position information of the loaded object on the base portion comprises:

determining the position information of the loaded object on the base portion and form information of the loaded object, the form information comprising at least one piece of stress information, shape information, structure information, and physical information.

18. An underactuated system robot for bearing an object, comprising:

a vehicle wheel portion;

a base portion coupled to the vehicle wheel portion, the base portion being configured to bear the object; and a controller configured to control the underactuated system robot by acquiring position information of the object on the base portion, controlling at least one of the base portion or the vehicle wheel portion to move according to status information of the object on the base portion to prevent the object from falling from the base portion, wherein the status information is acquired by performing contact position coordinate transformation according to position information of the object with respect to the base portion.

19. The underactuated system robot for bearing the object according to claim 18, wherein the vehicle wheel portion comprises a leg portion and a wheel portion, and the controller is further configured to:

move the wheel position and the base portion inclinedly according to the status information, such that movement of the base portion and movement of the wheel portion interacting with each other through stretching/retraction of the leg portion to maintain body balance of the underactuated system robot and prevent the object from falling from the base portion.

20. A non-transitory computer-readable storage medium, storing at least one computer program, the at least one computer program, when executed by at least one processor, causing an underactuated system robot to perform steps comprising:

acquiring position information of a loaded object on a base portion;

performing contact position coordinate transformation according to the position information to determine status information of the loaded object on the base portion; and controlling at least one of the base portion or a vehicle wheel portion to move according to the status information to prevent the loaded object from falling from the base portion.

\* \* \* \* \*